(12) United States Patent
Hagano et al.

(10) Patent No.: US 7,278,547 B2
(45) Date of Patent: Oct. 9, 2007

(54) CAP DEVICE

(75) Inventors: Hiroyuki Hagano, Aichi-ken (JP);
Masayuki Nakagawa, Aichi-ken (JP);
Masaki Akagi, Okazaki (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 374 days.

(21) Appl. No.: 10/933,207

(22) Filed: Sep. 2, 2004

(65) Prior Publication Data

US 2005/0051558 A1    Mar. 10, 2005

(30) Foreign Application Priority Data

Sep. 5, 2003    (JP) ............................ 2003-314149
Sep. 26, 2003   (JP) ............................ 2003-335071
Nov. 25, 2003   (JP) ............................ 2003-393836

(51) Int. Cl.
*B65D 53/00*   (2006.01)
(52) U.S. Cl. ............... 220/304; 220/DIG. 33; 220/DIG. 32; 220/288; 215/301
(58) Field of Classification Search ........ 220/DIG. 33, 220/DIG. 34, 288; 215/330, 331
See application file for complete search history.

(56) References Cited

U.S. PATENT DOCUMENTS

| | | | |
|---|---|---|---|
| 4,730,747 A * | 3/1988 | Schiemann ................. | 220/288 |
| 4,795,053 A * | 1/1989 | Kasugai et al. ............ | 220/203.2 |
| 4,854,471 A * | 8/1989 | Kasugai et al. ............ | 220/288 |
| 5,148,934 A * | 9/1992 | Kasugai et al. ............ | 220/203.25 |
| 5,183,173 A * | 2/1993 | Heckman ................. | 220/203.07 |
| 5,238,136 A * | 8/1993 | Kasugai et al. ............ | 220/304 |
| 5,279,439 A * | 1/1994 | Kasugai et al. ............ | 220/203.23 |
| 5,680,954 A * | 10/1997 | Arnold et al. ............. | 220/300 |
| 5,952,559 A * | 9/1999 | Harris et al. .............. | 73/49.7 |
| RE36,959 E * | 11/2000 | Griffin .................... | 220/210 |
| 6,508,374 B1 * | 1/2003 | Griffin et al. ............. | 220/304 |
| 2002/0066734 A1 * | 6/2002 | Harris .................... | 220/304 |
| 2002/0074335 A1 * | 6/2002 | Ono et al. ................ | 220/304 |

FOREIGN PATENT DOCUMENTS

| | | |
|---|---|---|
| JP | U-S59-83766 | 6/1984 |
| JP | A-2000-142738 | 5/2000 |

OTHER PUBLICATIONS

U.S. Appl. No. 10/852,694, filed May 25, 2004, Hagano et al.

* cited by examiner

*Primary Examiner*—Anthony Stashick
*Assistant Examiner*—Christopher McKinley
(74) *Attorney, Agent, or Firm*—Posz Law Group, PLC

(57) ABSTRACT

A fuel cap has a male threading element which is formed on an outer circumference of a closer of the fuel cap, a female threading element which is formed on an inner wall of a filler neck, and a handle. Rotation of the handle in a closing direction screws the male threading element into the female threading element. A stopper formed on the male threading element comes into contact with the start end of the female threading element to complete the closing operation. At this fully closed position, a gasket located between the closer and a sealing face of the filler neck is pressed and displaced in an axial direction to seal the sealing face of the filler neck with a sealing face pressure of not less than a preset level.

8 Claims, 22 Drawing Sheets

CAP DEVICE

This application claims the benefit of and priority from Japanese Application No. 2003-314149 filed Sep. 5, 2003, Japanese Application No. 2003-335071 filed Sep. 26, 2003 and Japanese Application No. 2003-393836 filed Nov. 25, 2003, the contents of which are incorporated herein by reference.

BACKGROUND OF THE INVENTION

1. Field of the Invention

The present invention relates to a cap device having a cap that is screwed into a tank opening.

A fuel cap of conventional structure is screwed into a filler neck (opening formation member) by several rotations of a handle of the fuel cap. A ratchet mechanism is typically formed between a closer and the handle to run idle at a torque of not less than a preset level and thereby clamp a gasket with the preset torque. Multiple rotations of the handle are required to screw the fuel cap into the filler neck. The ratchet mechanism does not fix the position of the handle when the fuel cap is screwed into the filler neck. This leads to poor operation performance.

2. Description of the Related Art

A quick-turn cap has been proposed to solve the above problem (see, for example, JP No. 2000-142738A). In this proposed structure, a neck engagement projection with an insertion cut is formed on an inner wall of the filler neck, while a cap engagement projection is formed at a position of 180 degrees in a circumferential direction on an outer circumference of the cap. The cap engagement projection is fit into the insertion cut of the neck engagement projection and is rotated by approximately 180 degrees, so that the cap engagement projection engages with the neck engagement projection. This proposed structure further has a stopper formed on the inner wall of the filler neck to stop rotation of the cap and thereby fix the position of the handle. This proposed structure, however, has relatively complicated shape since the neck engagement projection and the stopper are formed on the inner wall of the filler neck. Fabrication of this structure is not easy especially when the filler neck is made of a metal pipe.

SUMMARY OF THE INVENTION

The object of the invention is to eliminate the drawbacks of the prior art and to provide a cap device that has excellent operation performance to fix the position of a handle at a full close position of a tank opening and ensures easy manufacture of an opening formation member.

In order to attain at least part of the above and the other related objects, the present invention is directed to a cap device, which includes: a pipe-shaped opening formation member having a tank opening and a flow path connecting the tank opening to a tank; a cap having a closer that closes the tank opening and a handle that is mounted on the closer to rotate the closer in either of a closing direction and an opening direction; a gasket that is located between an outer circumference of the closer and a sealing face of the opening formation member; and a screw mechanism having a first threading element that is formed on an inner wall of the opening formation member and a second threading element that is formed on the outer circumference of the closer to engage with the first threading element. The second threading element is screwed into the first threading element from a start end of the first threading element in response to rotation of the handle in the closing direction, so that the gasket is pressed against and displaced relative to the inner wall of the opening formation member to screw the cap into the opening formation member. The second threading element of the screw mechanism has a stopper ($21d$) that comes into contact with the start end of the first threading element and is designed to restrict further rotation of the closer in the closing direction when the gasket is pressed in an axial direction by at least a predetermined displacement.

In the cap device of the invention, the user holds the handle, inserts the closer into the tank opening, and screws the cap into the tank opening via the screw mechanism to close the tank opening with the cap. The screw mechanism has the first threading element formed on the inner wall of the opening formation member, and the second threading element formed on the outer circumference of the closer. Rotation of the handle in the closing direction screws the second threading element into the first threading element from the start end of the first threading element. The stopper formed in the vicinity of a terminal end of the second threading element comes into contact with the start end of the first threading element to complete the closing operation of the cap. At this full close position, the gasket located between the closer and the inner wall of the opening formation member is pressed and displaced in the axial direction to be hit against the stopper and seal the sealing face of the opening formation member with a sealing face pressure of not less than a preset level.

In the structure of the invention, the position of the handle at a closing start position of the cap is defined by the start end of the first threading element, while the position of the handle at the full close position of the cap is defined by the stopper. This structure fixes the position of the handle in the rotating direction in both of a closing operation and an opening operation. This ensures good operation performance.

The displacement of the gasket in the axial direction is restricted by the stopper formed on the closer. This effectively prevents excessive compression of the gasket and thereby improves the durability of the gasket.

The second threading element of the closer is screwed into the conventional first threading element formed on the inner wall of the opening formation member. The technique of the invention does not require any additional element as discussed in the prior art and attains the similar effects by the simpler structure.

The screw mechanism preferably has a relatively large pitch that enables the closer to move at least 2 mm in the axial direction by rotation of 180 degrees. This attains opening and closing operations by a small angle of rotation and thus ensures the good operation performance.

It is preferable that the gasket has a reactive force of not greater than 160 N from the sealing face of the opening formation member and a sealing face pressure of not less than 0.3 MPa against the sealing face when the moving distance of the cap at the full close position is 3.0 mm. More specifically the gasket has a reactive force of not greater than 130 N and a sealing face pressure of not less than 0.5 MPa when the moving distance of the cap is 3.0 mm.

In one preferable embodiment of the cap device of the invention, the first threading element is a female threading element, and the second threading element is a male threading element. The stopper is a projection formed in a thread groove of the male threading element. The closer may have a ring-shaped seal support element that is protruded from the outer circumference of the closer to hold the gasket. The projection of the stopper may be a wall that crosses the thread groove formed between the seal support element and a thread ridge. The projection of the stopper may alternatively be a wall that crosses the thread groove of the male threading element. The wall crossing the thread groove functions as a rib relative to the seal support element or the thread ridge and enhances the mechanical strength of the support element or the thread ridge.

In one preferable embodiment of the cap device of the invention, the stopper has multiple pointed deformable projections at a site coming into contact with the leader of the first threading element. The multiple deformable projections are pressed by the leader of the first threading element and are deformed to follow the leader, when the cap closes the tank opening on the occasion of first use of the cap. The deformable projections are crushed to fill the grooves between the ridges and follow the shape of the leader. This increases the contact area of the stopper with the leader of the first threading element and avoids the state of partial plane contact with the leader, which leads to increasing slippage. The stopper accordingly does not ride over the leader of the first threading element and thus effectively stops rotation of the closer.

It is preferable that the multiple deformable projections form a chain of ridges having triangular cross sections (continuous wall). When the ridges of the deformable projections come into contact with the leader of the first threading element, the multiple deformable projections are readily deformed to fill the grooves between the ridges with the crushed resin material.

When the opening formation member is made of a metal pipe and the first threading element is produced by plastic forming, there is a difficulty in forming the first reading element to have a sharp-pointed shape. The arrangement of the invention, however, causes the multiple deformable projections of the stopper to be deformed and follow the shape of the leader of the first threading element. This does not require plastic forming of the first threading element on the opening formation member to have the sharp-pointed leader, thus facilitating production of the first threading element.

In another preferable embodiment of the cap device of the invention, the projection of the stopper may be extended along the second threading element or a terminal end of the thread groove of the second threading element may be formed as an upright wall functioning as the stopper. Either of these structures desirably enhances the mechanical strength of the stopper and extends the distance of the leader of the first threading element to ride over the stopper. This arrangement thus prevents the leader of the first threading element from riding over the stopper and effectively stops rotation of the closer.

In one modified structure of the invention, when the opening formation member is made of a resin material, multiple deformable projections may be formed on a leader of the opening formation member. The deformable projections formed on the leader of the opening formation member are pressed by a stopper of a cap and are deformed to follow the shape of the stopper. In this modified structure, it is preferable that the resin material of the opening formation member has a hardness to attain easier plastic deformation, compared with a resin material of the cap.

These and other objects, features, aspects, and advantages of the present invention will become more apparent from the following detailed description of the preferred embodiments with the accompanied drawings.

BRIEF DESCRIPTION OF THE DRAWINGS

FIG. 30 (C) shows a series of the action of the stopper;

DESCRIPTION OF THE PREFERRED EMBODIMENTS

Some modes of carrying out the invention are discussed below as preferred embodiments.

(1) General Structure of Fuel Cap 10

Figure 1:
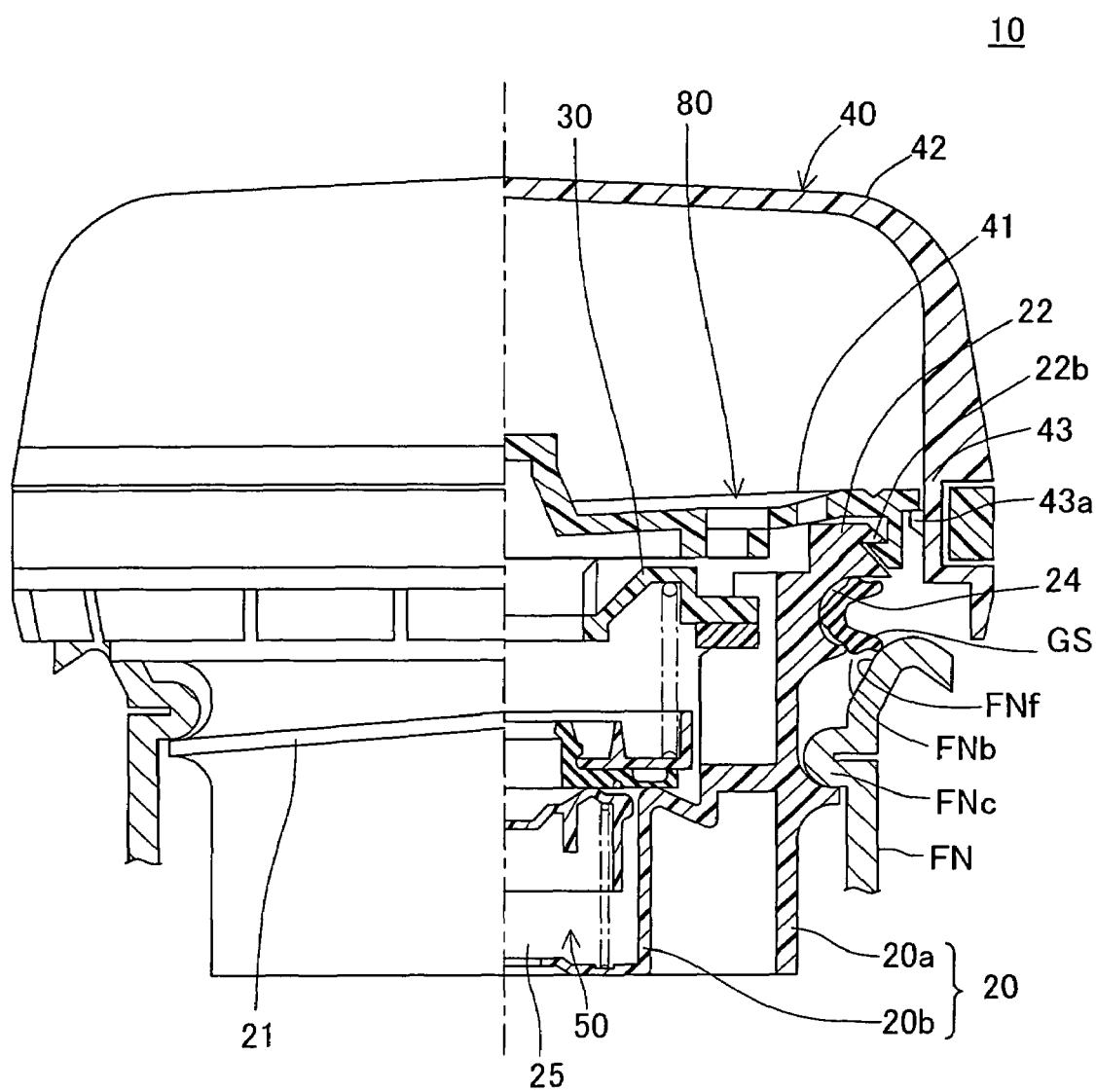
FIG. 1 is a half sectional view showing a fuel cap in one embodiment of the invention.

FIG. 1 is a half sectional view showing a fuel cap 10 (cap device) in one embodiment of the invention. The fuel cap 10 is attached to a filler neck FN having an inlet opening FNb (tank opening) to feed a supply of fuel to a fuel tank (not shown). The fuel cap 10 has a cap main body 20 (closer) that is made of a synthetic resin material like polyacetal, a cover 40 that is mounted on the cap main body 20 and has a handle the cover 40 made of a synthetic resin material like nylon, an inner cover 30 that closes an upper opening of the cap main body 20 and defines a valve chest 25, a pressure regulating valve 50 that is received in the valve chest 25, a torque mechanism 80, and a ring-shaped gasket GS that is attached to the upper outer circumference of the cap main body 20 to seal the cap main body 20 from the filler neck FN.

(2) Construction of Constituents of Fuel Cap 10

The construction of the respective constituents of the fuel cap 10 in the embodiment is discussed below in detail.

(2)-1 Cap Main Body 20

The cap main body 20 has a substantially cylindrical outer tubular body 20*a* with a male threading element 21 (second threading element), which engages with a female threading element FNc (first threading element) formed on the inner wall of the pipe-shaped filler neck FN (opening-formation member), and a valve chest-formation body 20*b* that is located in the lower portion of the inside of the outer tubular body 20*a*. The valve chest-formation body 20*b* receives a positive pressure valve and a negative pressure valve functioning as the pressure regulating valve 50 therein. The inner cover 30 is pressed into the upper portion of the valve chest-formation body 20*b* to cover over the valve chest 25.

The gasket GS is set on a lower face of an upper flange 22 of the cap main body 20. The gasket GS is located between a seal support element 24 of the flange 22 and the inlet opening FNb of the filler neck FN. When the fuel cap 10 is inserted into the inlet opening FNb, the gasket GS is pressed against the seal support element 24 to exert the sealing effects. The seal support element 24 has a curved face to hold the gasket GS.

Figure 2:
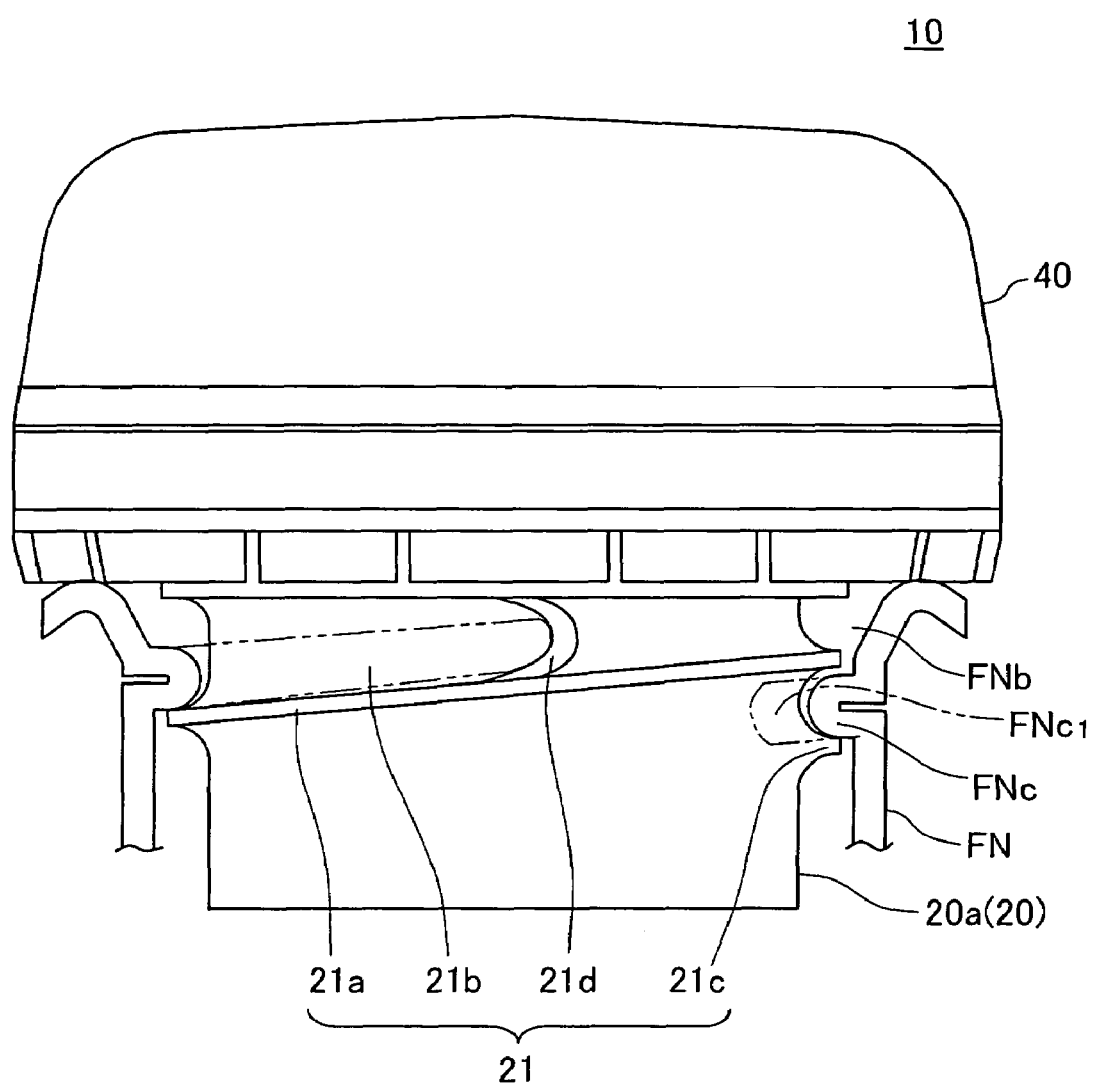
FIG. 2 shows the fuel cap that is screwed to a filler neck to close a inlet opening.
Figure 3:
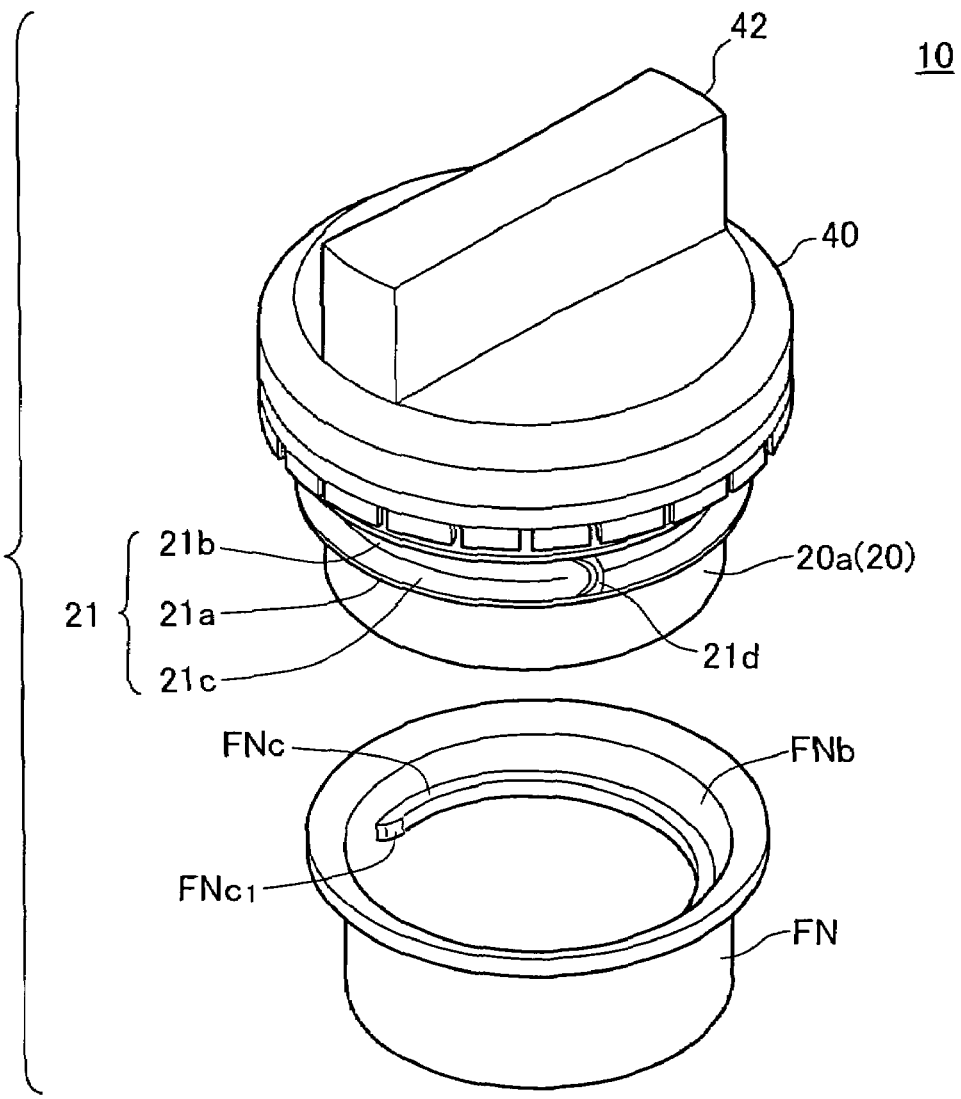
FIG. 3 is a perspective view showing the fuel cap detached from the filler neck.

FIG. 2 shows the fuel cap 10 that is screwed to the filler neck FN to close the inlet opening FNb. FIG. 3 is a perspective view showing the fuel cap 10 detached from the filler neck FN. With referring to FIGS. 2 and 3, a screw mechanism is formed on the inner circumferential wall of the filler neck FN and the outer circumference of the outer tubular body 20*a* of the cap main body 20. The screw mechanism functions to screw the fuel cap 10 to the filler neck FN, and includes the female threading element FNc (first threading element) formed on the inner wall of the filler neck FN and the male threading element 21 (second threading element) formed on the lower portion of the outer circumference of the outer tubular body 20*a*. The female threading element FNc is threading projections from a leader FNc1 close to the inlet opening FNb toward the depth of the fuel tank. The male threading element 21 has a thread ridge 21*a* and a thread groove 21*b*. The lower end of the thread ridge 21*a* is a leader 21*c* that engages with the leader FNc1 of the female threading element FNc (see FIG. 2). A stopper 21*d* is formed upright to cross the thread groove 21*b*. The stopper 21*d* is located at a position of about 200 degrees from the leader 21*c* of the male threading element 21. When the fuel cap 10 is inserted into the inlet opening FNb, the stopper 21*d* comes into contact with the leader FNc1 of the female threading element FNc to restrict further rotation of the fuel cap 10 in its closing direction. The female threading element FNc has a screw thread pitch of 6.35 mm per rotation.

When the fuel cap 10 fit in the inlet opening FNb is rotated in its closing direction, the male threading element 21 is screwed in the female threading element FNc. When the gasket GS is compressed in the axial direction to or over a preset displacement, the stopper 21*d* comes into contact with the leader FNc1 of the female threading element FNc to restrict further rotation. The fuel cap 10 is fastened to the filler neck FN in this state.

(2)-2 Gasket (2)-2-1 Structure of Gasket GS

Figure 4:
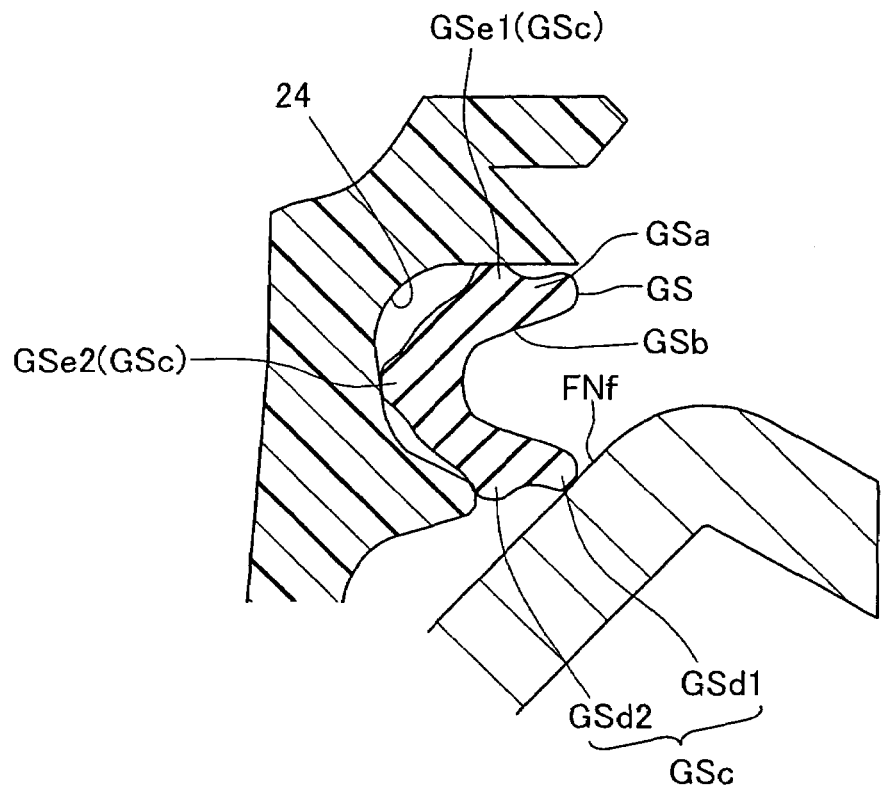
FIG. 4 is an enlarged sectional view showing a gasket attached to a seal support element of the fuel cap.

FIG. 4 is an enlarged sectional view showing the gasket GS attached to the seal support element 24 of the fuel cap 10. The gasket GS has a gasket main body GSa that is formed in a substantially V shape and is compressed to shorten the length in its bending direction. The gasket main body GSa has a substantially U-shaped slit GSb open to the outer circumference.

Multiple sealing projections GSc are protruded from the outer circumference of the gasket main body GSa. The multiple sealing projections GSc include a first pipe sealing projection GSd1 and a second pipe sealing projection GSd2, which come into contact with a pipe sealing face FNf, and a first body sealing projection GSe1 and a second body sealing projection GSe2, which come into contact with the seal support element 24.

The first pipe sealing projection GSd1 is formed on an opening end of the slit GSb and is protruded to be pressed against the pipe sealing face FNf in an initial stage of a closing operation. The second pipe sealing projection GSd2 is protruded to have a greater sealing face pressure than the first pipe sealing projection GSd1 and to be pressed against the pipe sealing face FNf after the initial stage of the closing operation.

Figure 5:
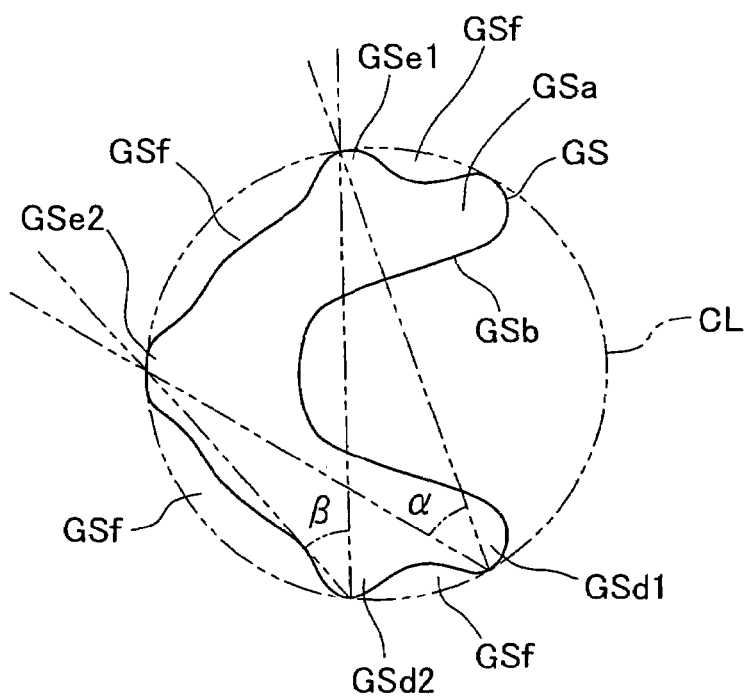
FIG. 5 illustrates the shape of the gasket.
Figure 6A:
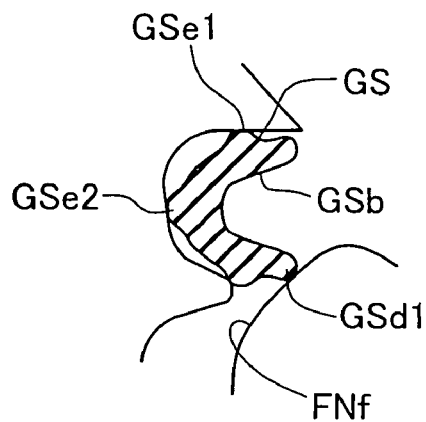
FIG. 6(A) shows a series of compression of the gasket as the fuel cap is closed.
Figure 6B:
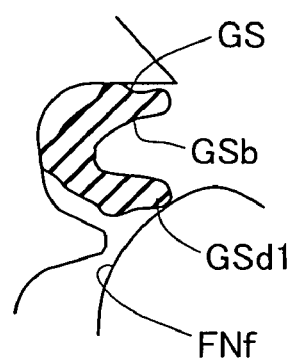
FIG. 6(B) shows the series of the compression of the gasket after the state of FIG. 6(A)
Figure 6C:
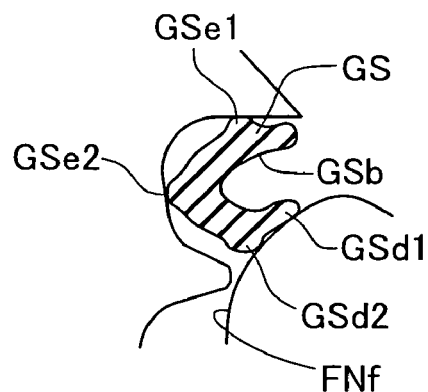
FIG. 6(C) shows the series of the compression of the gasket after the state of FIG. 6(B)
Figure 6D:
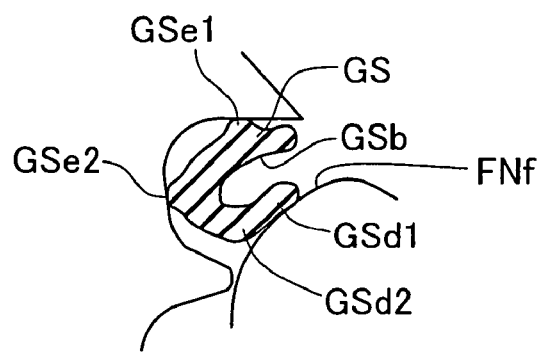
FIG. 6(D) shows the series of the compression of the gasket after the state of FIG. 6(C)

FIG. 5 illustrates the shape of the gasket GS. As illustrated in FIG. 5, the first body sealing projection GSe1 and the second body sealing projection GSe2 are positioned to have practically equal angles a and B in a range of 30 to 45 degrees to the first pipe sealing projection GSd1 and to the second pipe sealing projection GSd2 in a non-compressed state of the gasket GS. The first body sealing projection GSe1 and the second body sealing projection GSe2 are positioned to produce a maximum stress to a reactive force produced when the first pipe sealing projection GSd1 and the second pipe sealing projection GSd2 are pressed against the pipe sealing face FNf The gasket main body GSa has thin wall sections GSf between the adjoining sealing projections GSc to define hollow elements from the seal support element 24. The hollow elements defined by the thin wall sections GSf reduce the total cross section of the gasket GS to 30 to 50% or preferably 35 to 45% of the area of an imaginary circle CL going through the apexes of the sealing projections GSc.

The sealing projections GSc preferably have a curvature R of not less than 0.5 mm. This curvature facilitates cleaning of recesses in an injection mold for the gasket GS with the sealing projections GSc and enhances the productivity.

(2)-2-2 Functions of Gasket GS

FIG. 6 shows compression of the gasket GS as the fuel cap 10 is closed. In the initial stage of the closing operation of the fuel cap 10, the first pipe sealing projection GSd1 of the gasket GS comes into contact with the pipe sealing face FNf (FIG. 6(A)). The further closing operation causes the gasket GS to be compressed in the bending direction and narrow the opening of the slit GSb (FIG. 6(B)). In the next stage, the second pipe sealing projection GSd2 comes into contact with the pipe sealing face FNf (FIG. 6(C)). In the last stage, the second pipe sealing projection GSd2 is pressed against the pipe sealing face FNf, so that the fuel cap 10 closes the inlet opening FNb (FIG. 6(D)). Namely the first pipe sealing projection GSd1 mainly exerts the sealing effects in the initial stage of the closing operation. The second pipe sealing projection GSd2 exerts the sealing effects in the closed state of the fuel cap 10.

Figure 7:
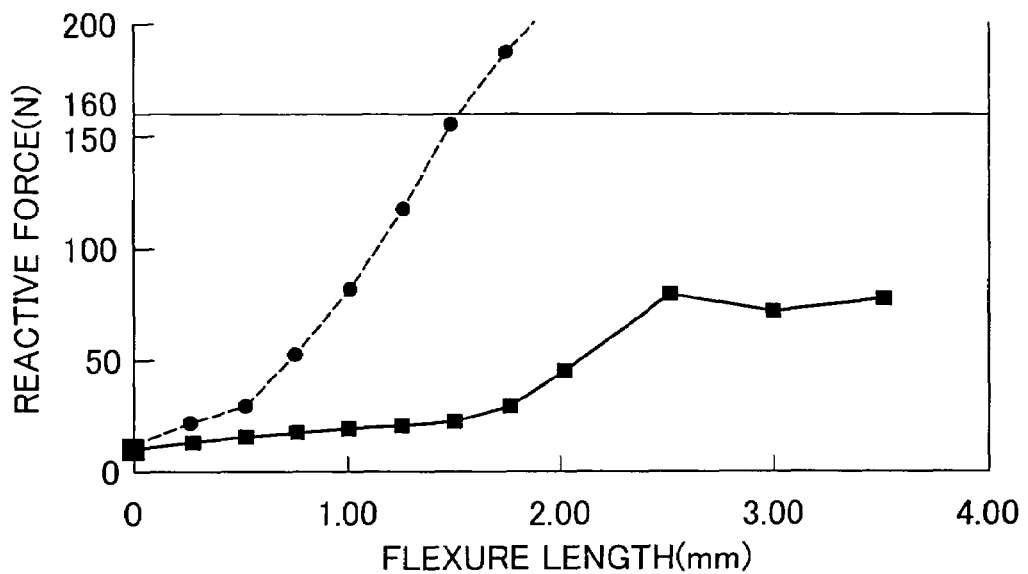
FIG. 7 is a graph showing variations in reactive force against the flexure length of the gasket.

FIG. 7 is a graph showing variations in reactive force against the flexure length of the gasket. The solid-line curve regards the gasket GS of the embodiment and the dotted-line curve regards a prior art C-shaped gasket. Here the flexure length represents a compressed length (compression degree) of the gasket in its bending direction. The relation between the flexure length and the rotational angle of the fuel cap depends upon various parameters like the hardness and the shape of the gasket. In an example where a 360-degree rotation of a fuel cap gives a flexure length of 6.3 mm, the fuel cap closed at an angle of 198 degrees gives a flexure length of 3.6 mm. The fuel cap rotated from its full close position in its opening direction by 90 degrees gives a flexure length of 1.6 mm.

The closing operation of the fuel cap bends the gasket and increases the reactive force of the gasket. The reactive force of greater than 160 N produced in the closing operation of the fuel cap deteriorates the operating characteristics of the fuel cap. The reactive force is thus preferably not greater than 160 N or more preferably not greater than 130 N. The prior art gasket gives only a flexure length of about 1.5 mm at the reactive force of 160 N and has an abrupt increase in reactive force to deteriorate the operating characteristics. The gasket GS of the embodiment, on the other hand, gives a flexure length of at least 3.6 mm in the full close position and does not have any abrupt increase in reactive force to ensure the good operating characteristics.

Figure 8:
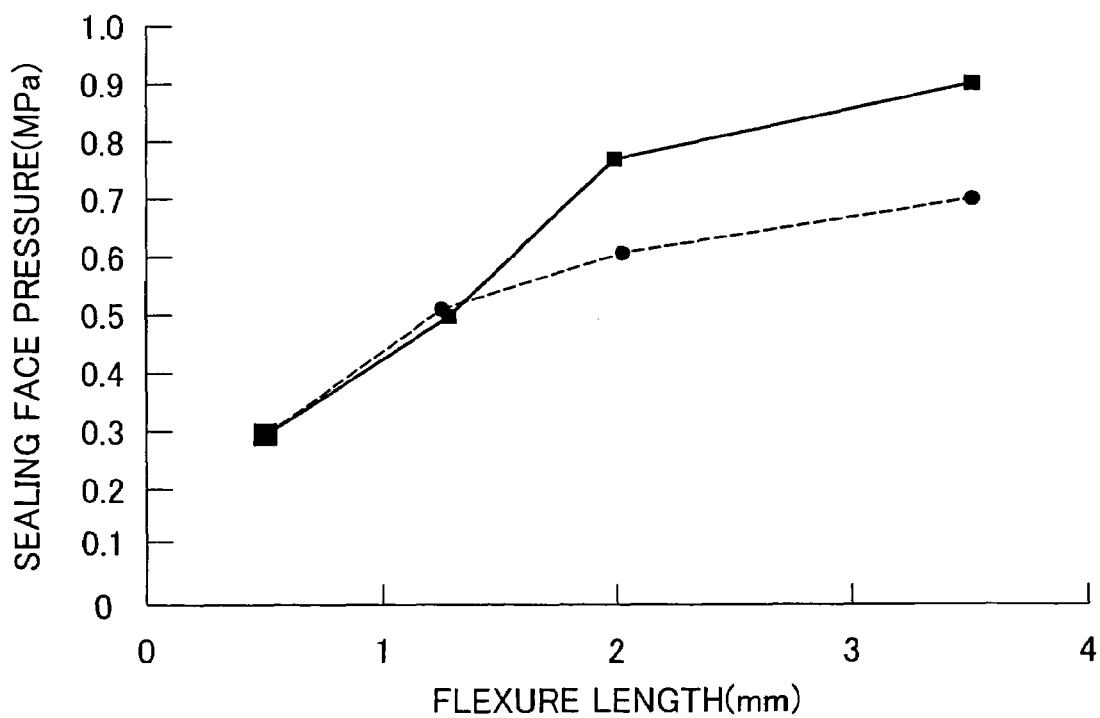
FIG. 8 is a graph showing variations in sealing face pressure against the flexure length of the gasket.

FIG. 8 is a graph showing variations in sealing face pressure against the flexure length of the gasket. The solid-line curve regards the gasket GS of the embodiment and the dotted-line curve regards the prior art C-shaped gasket. Here the sealing face pressure represents a pressure of the gasket against the pipe sealing face FNf. As the fuel cap 10 is closed, the sealing face pressure increases with an increase in flexure length of the gasket GS. In the initial stage of the closing operation having the flexure length of 0.5 to 1.3 mm, the first pipe sealing projection GSd1 mainly contributes to the increase in sealing face pressure. With an increase in closing angle of the fuel cap 10 to make the flexure length of the gasket GS exceed 1.3 mm, the place of the large sealing face pressure shifts from the first pipe sealing projection GSd1 to the second pipe sealing projection GSd2. As shown in FIGS. 7 and 8, the gasket GS of the embodiment ensures the greater sealing face pressure with the smaller reactive force, compared with the prior art C-shaped gasket.

In order to ensure the sealing face pressure of at least a preset level against the flexure length of the gasket GS and prevent an excessive stress from being applied to the gasket GS, the stopper 21d (see FIG. 2) defines the full closing depth to be not less than 2 mm or preferably to be in a range of 3 to 5 mm.

Figure 9:
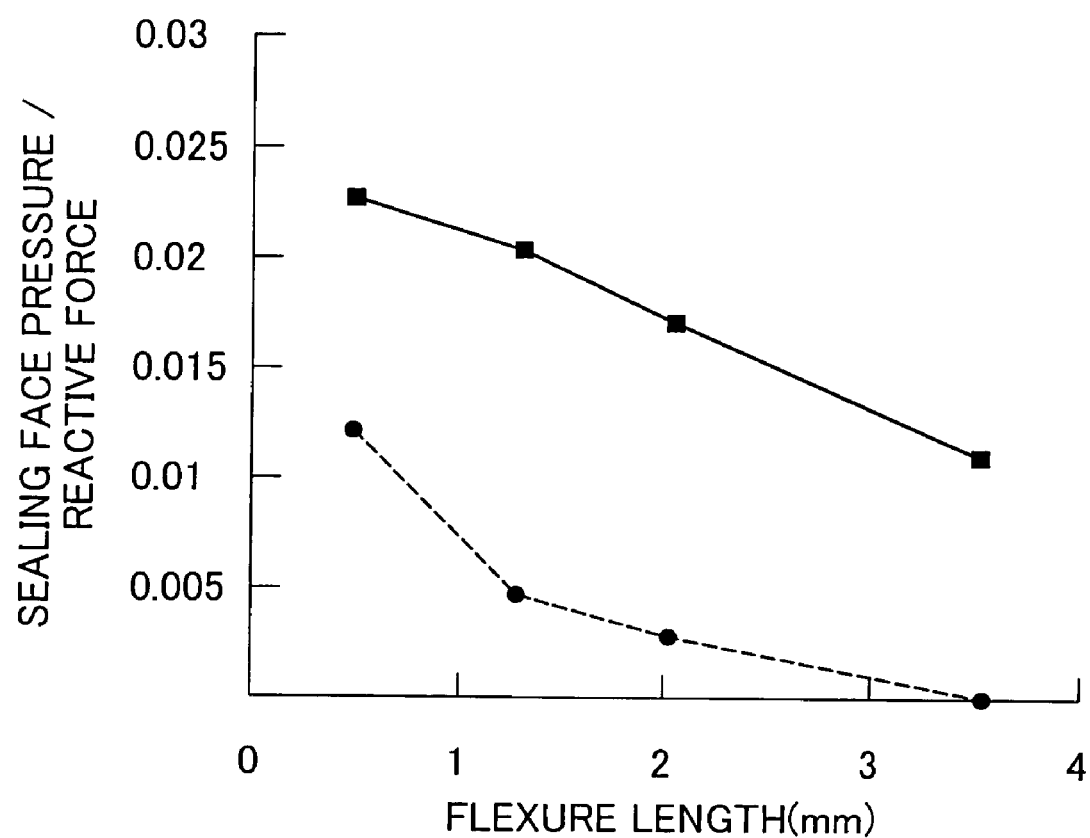
FIG. 9 is a graph showing variations in sealing face pressure by reactive force against the flexure length of the gasket.

FIG. 9 is a graph showing variations in sealing face pressure by reactive force against the flexure length of the gasket. The solid-line curve regards the gasket GS of the embodiment and the dotted-line curve regards the prior art C-shaped gasket. As clearly understood from the graph of FIG. 9, the gasket GS of the embodiment has the greater sealing face pressure per unit reactive force against the same flexure length, compared with the prior art C-shaped gasket.

(2)-2-3 Effects of Gasket GS

1. The gasket GS of the embodiment gives a greater sealing face pressure with a smaller closing force and ensures the good operating characteristics.

2. As shown in FIG. 5, the spaces defined by the thin wall sections GSf of the gasket GS reduce the total cross section of the gasket GS to 30 to 50% or preferably 35 to 45% of the area of the imaginary circle CL going through the apexes of the sealing projections GSc. The presence of the thin wall sections GSf desirably decreases the required quantity of the material, while ensuring the high sealing face pressure of the gasket GS. The gasket GS can thus be made of a rubber material having excellent fuel permeation resistance, for example, expensive fluororubber, without increasing the manufacturing cost. The fluororubber exerts the excellent fuel permeation resistance even when an alcohol of a small molecular weight is applied to the fuel.

3. The fuel cap 10 may adopt a quick-turn structure to open and close the inlet opening FNb by simple rotation of a preset angle, for example, 180 degrees. In this structure, the cover 40 is generally required to have a lost motion mechanism that idles in the range of a preset angle, in order to prevent a decrease in sealing face pressure of the gasket due to an external force applied to the cover 40. The gasket GS of the embodiment, however, ensures the high sealing properties even when the cover 40 receives an external force and rotates in its opening direction by approximately 90 degrees in to decrease the flexure length to about 1.6 mm. The gasket GS of the embodiment thus ensures the sufficient sealing face pressure of or over a preset level without the lost motion mechanism of the complicated structure.

4. While the gasket GS is swollen with the fuel, the first body sealing projection GSe1 and the second body sealing projection GSe2 prevent the outer face of the gasket main body GSa from coming into contact with the seal support element 24. This structure effectively prevents an increase in rotational torque with an increase in contact area.

5. The fuel cap 10 of the embodiment has the large screw thread pitch to move the cap main body 20 by at least 3 mm in the axial direction with a rotation of 180 degrees. This structure enables the fuel cap 10 to be opened and closed by rotation of a small angle and thus ensures the good operating characteristics.

6. The gasket GS of the embodiment is designed to hold the sealing face pressure of at least 0.3 MPa when the cap main body 20 is rotated by 90 degrees in its opening direction from the full close position. The gasket GS desirably ensures the sufficient sealing properties even when the cap main body 20 is rotated by approximately 90 degrees in its opening direction from the full close position due to an external force.

(2)-3 Structure of Cover 40

Referring back to FIG. 1, the cover 40 functions as a manipulating mechanism and is attached to the flange 22 via the torque mechanism 80 in a rotatable and freely detachable manner. The cover 40 includes an upper wall 41, a handle 42 mounted on the upper wall 41, and a side wall 43 formed around the upper wall 41 and is integrally made of a conductive resin by injection molding. Engagement projections 43a are protruded inward from the side wall 43 to be arranged at equal intervals along the circumference. The engagement projections 43a function to fix the cover 40 to the cap main body 20 via the torque mechanism 80. The attachment structure of the cover 40 is discussed below.

(2)-4 Construction of Torque Mechanism 80

(2)-4-1 General Structure of Torque Mechanism 80

Figure 10:
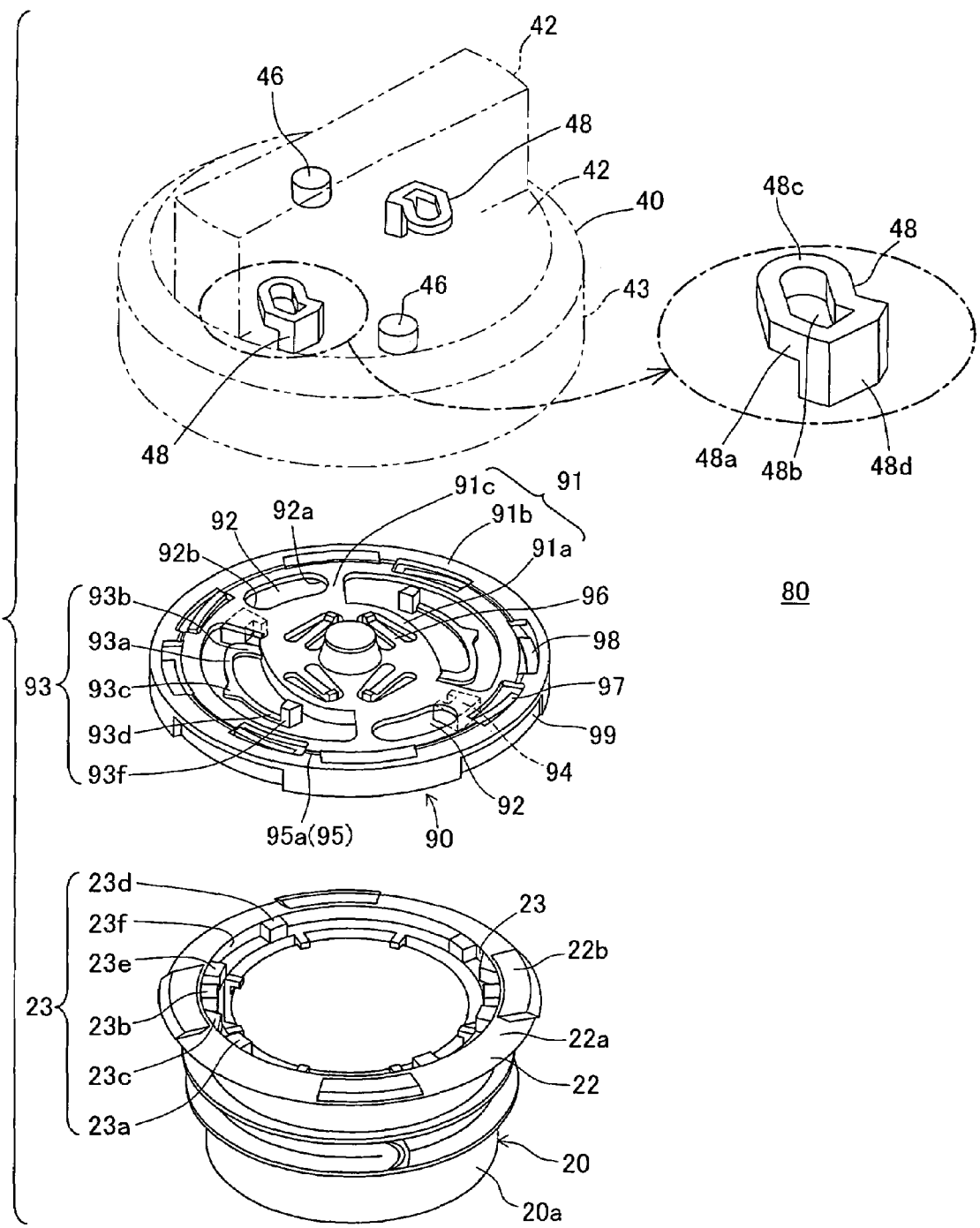
FIG. 10 is a decomposed perspective view showing a torque mechanism located on a cover and an upper portion of a cap main body.
Figure 11:
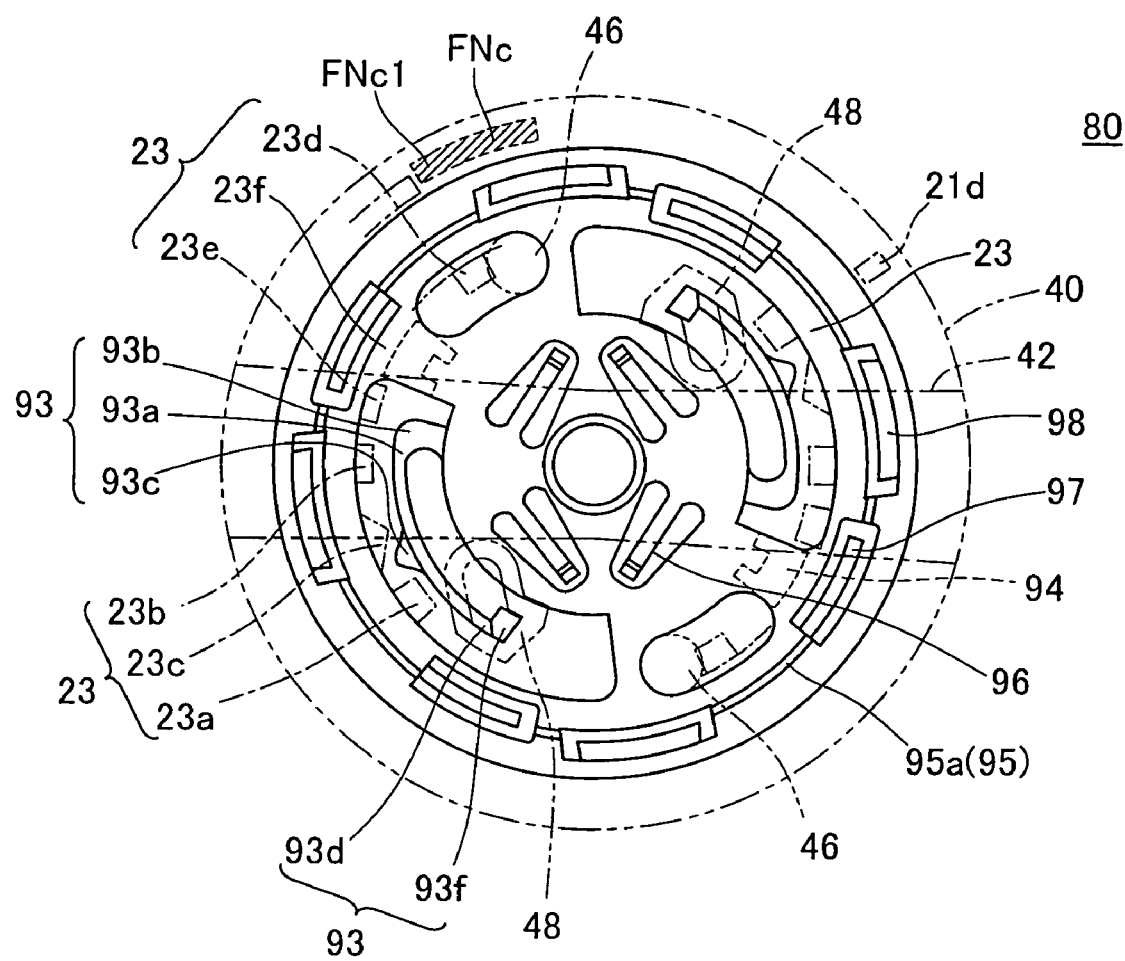
FIG. 11 is a top view of the torque mechanism.

FIG. 10 is a decomposed perspective view showing the torque mechanism 80 located on the cover 40 and the upper portion of the cap main body 20. FIG. 11 is a top view of the torque mechanism 80. The torque mechanism 80 clicks when the cover 40 receives a rotational torque of or over a preset level in the closing operation of the fuel cap 10 in the inlet opening FNb. The user can thus confirm that the fuel cap 10 is attached to the filler neck FN with a rotational torque of or over the preset level.

As shown in FIGS. 10 and 11, the torque mechanism 80 includes two body engagement elements 23 arranged along the circumference of the outer tubular body 20a, cover engagement elements 46 and guide elements 48 that are protruded from the bottom face of the upper wall 41 of the cover 40, and a torque plate 90.

(2)-4-2 Structure of Body Engagement Element 23

The body engagement elements 23 are arranged on the circumference 1o of the outer tubular body 20a to catch the torque plate 90 for transmission of a rotational torque. Each of the body engagement elements 23 has a first locking end 23a, a second locking end 23b, and a ridge-like engagement projection 23c (first engagement element) protruded between the first locking end 23a and the second locking end 23b. The body engagement element 23 also has a first guide end 23d, a second guide end 23e, and a guide step 23f formed between the first guide end 23d and the second guide end 23e.

(2)-4-3 Structure of Cover 40

The two cover engagement elements 46 are protruded from the bottom face of the upper wall 41 of the cover 40 to be arranged along the circumference of the cover 40. Each of the cover engagement elements 46 of the cover 40 is a cylindrical projection to catch the torque plate 90 for transmission of a rotational torque. Each of the guide elements 48 has a peripheral guide wall 48a, a first guide groove 48b, and a second guide groove 48c. The first guide groove 48b is formed on the circumference around the rotational axis, while the second guide groove 48c is formed to be coupled with the first guide groove 48b and to be inclined relative to the axial center. A guide locking upright wall 48d is formed on the end of the first guide groove 48b and on the end of the peripheral guide wall 48a to face the first guide groove 48b.

(2)-4-4 Structure of Torque Plate 90

The torque plate 90 has a disc-shaped torque body 91 made of a resin. The torque body 91 includes a disc-shaped arm support 91a, an outer ring 91b surrounding the arm support 91a, and a linkage element 91c linking the arm support 91a with the outer ring 91b. Guide grooves, torque arms, and spring elements are formed on the torque body 91. Torque arms 93 (second engagement elements) are formed on the arm support 91a. Each of the torque arms 93 includes an arm body 93a protruded from the arm support 91a, a torque engagement projection 93c protruded from the outer circumference of the arm body 93a, and a guide projection 93f protruded upward from a free end 93d of the arm body 93a. The torque arm 93 is a cantilever with a support base 93b as the fulcrum and has the free end 93d apart from the torque body 91 by a certain distance.

With a rotation of the cover 40 in the closing direction (clockwise), the torque engagement projection 93c is pressed against the engagement projection 23c of the body engagement element 23. The dual support of the support base 93b and the free end 93d bends the torque arm 93 in the direction perpendicular to its longitudinal axis and causes the torque engagement projection 93c of the torque arm 93 to ride over the engagement projection 23c of the body engagement element 23 (see FIG. 19).

(2)-4-5 Attachment Structure of Torque Plate 90 and Cover 40

Figure 12:
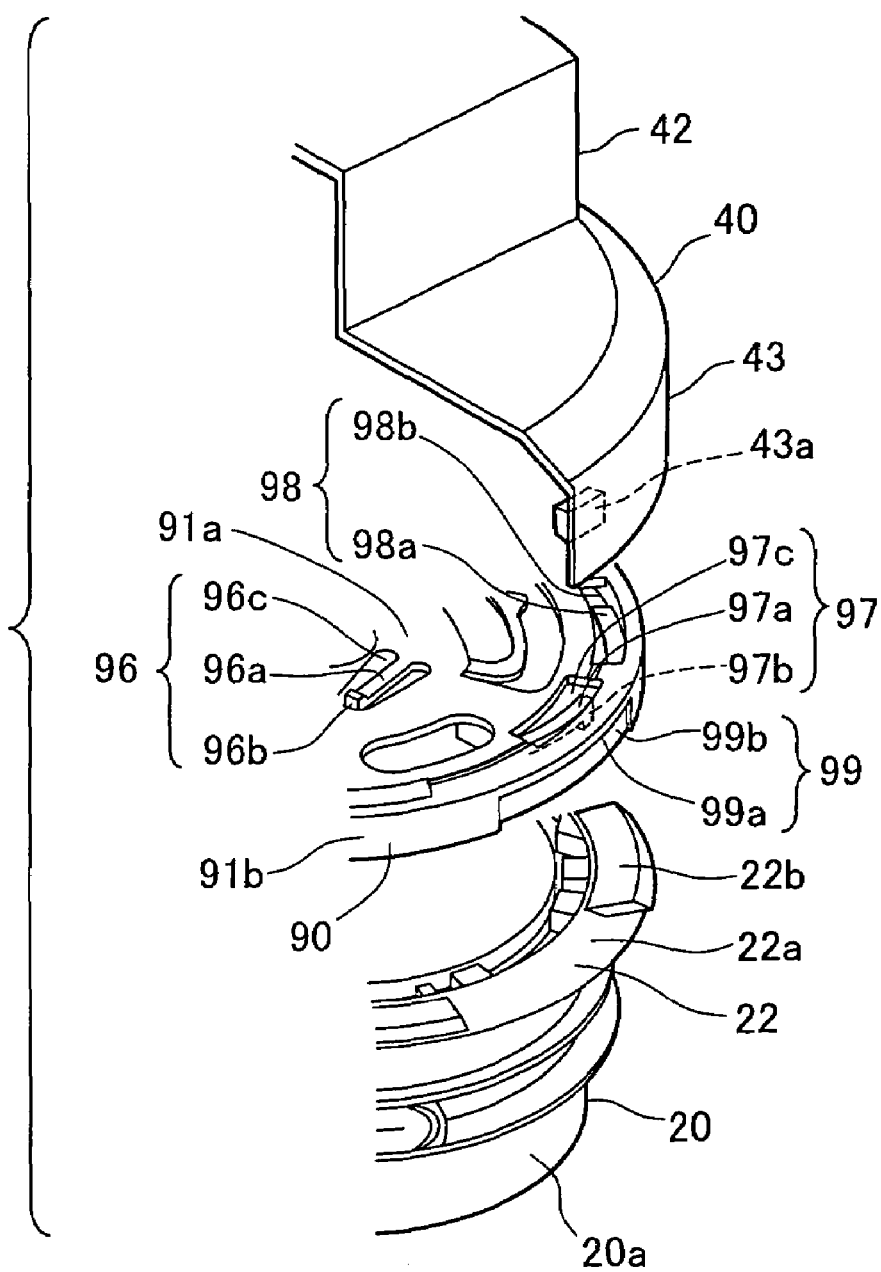
FIG. 12 is a perspective view showing a main part of the torque mechanism.
Figure 13:
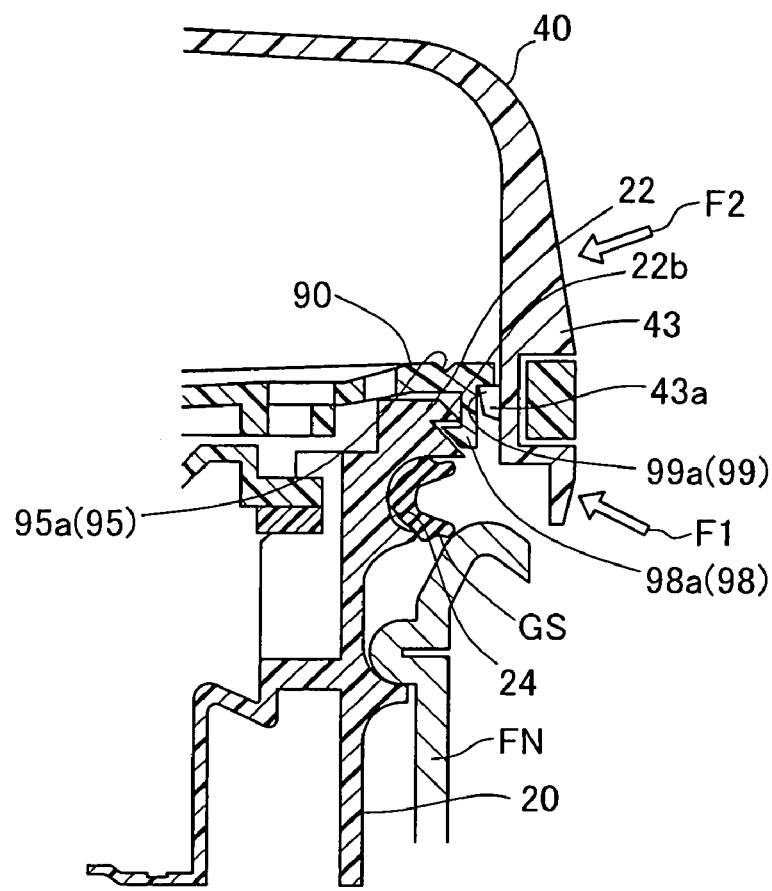
FIG. 13 is a sectional view showing the side of the fuel cap.

The following describes the attachment structure (plate attachment mechanism) of the cap main body 20 and the torque plate 90 and the attachment structure (grip attachment mechanism) of the torque plate 90 and the cover 40. FIG. 12 is a perspective view showing a main part of the torque mechanism 80. FIG. 13 is a sectional view showing the side of the fuel cap 10. Catching claws 98a of plate engagement elements 98 are formed along the inner circumference of the outer ring 91b of the torque plate 90. The catching claws 98a are protruded from the inner wall of the outer ring 91b toward the center axis and are formed to be observable from the top through notches 98b and elastically deformable in the axial direction. Arc-shaped catching projections 22b are formed on the outer circumference of the flange 22 of the cap main body 20. The torque plate 90 is attached to the cap main body 20 in a rotatable manner through engagement of the catching claws 98a with the catching projections 22b.

Fixation elements 99 are arranged on the outer circumference of the outer ring 91b of the torque plate 90. Each of the fixation elements 99 has a catching recess 99b to form a catching claw 99a. The engagement projections 43a formed inward on the side wall 43 of the cover 40 are fit in the catching recesses 99b of the mating fixation elements 99, so that the torque plate 90 supports the cover 40 in a rotatable manner (approximately 20 degrees). The fixation positions of the engagement projections 43a with the catching recesses 99b of the fixation elements 99 is located above the fixation positions of the catching claws 98a of the plate engagement elements 98 with the catching projections 22b of the flange 22.

The torque plate 90 is attached to the cap main body 20 through engagement of catching claws 98a of the plate engagement elements 98 of the torque plate 90 with the catching projections 22b of the flange 22 of the cap main body 20. The cover 40 is then attached to the torque plate 90 through engagement of the engagement projections 43a of the cover 40 with the catching claws 99a of the torque plate 90. This assembles the cap main body 20, the torque plate 90, and the cover 40 to the fuel cap 10.

As shown in FIG. 10, fragile grooves 95a as part of fragile elements 95 are formed along the inner circumference of the outer ring 91b of the torque plate 90. The fragile grooves 95a are located to link the notches 98b in the circumferential direction.

When large external forces F1 and F2 are applied to the cover 40 as shown in FIG. 13, for example, at the time of a collision of a vehicle, the fragile elements 95 supporting the cover 40 may be broken along the circumference of the torque plate 90. Otherwise the catching claws 98a of the plate engagement elements 98 may be detached from the catching projections 22b of the flange 22, or the engagement projections 43a of the cover 40 may be detached from the fixation elements 99. In any case, the seal support element 24 of the cap main body 20 for holding the gasket GS is not damaged and thus ensures the sufficiently high sealing properties of the gasket GS. The fixation positions of the engagement projections 43a of the cover 40 with the catching recesses 99b of the fixation elements 99 of the torque plate 90 is located above the fixation positions of the catching claws 98a of the plate engagement elements 98 with the catching projections 22b of the flange 22. Application of the upper external force F2 in addition to the external force F1 leads to detachment of either the cover 40 or the torque plate 90. The structure of the embodiment thus ensures the high sealing properties against diverse external forces. In the case of application of the external force F2 onto the cover 40, the momentum is generated from the opposite fixation element 99 as the fulcrum to readily detach the cover 40.

The plate engagement elements 98 (plate attachment mechanism) and the fixation elements 99 (grip attachment mechanism) are optimized to set the breaking loads against the diverse external forces without restriction of the shape of the seal support element 24.

(2)-4-6 Support Mechanism of Torque Plate 90

Figure 14:
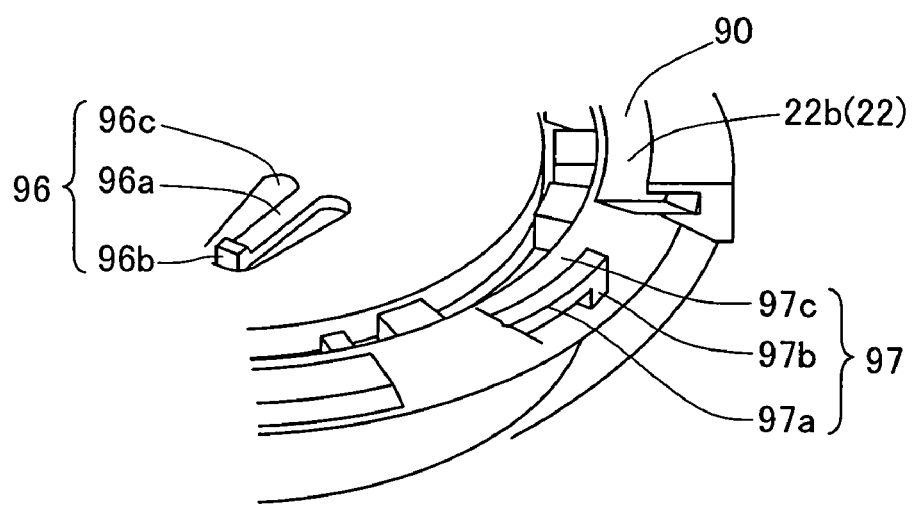
FIG. 14 shows the periphery of a torque plate in the torque mechanism.
Figure 15:
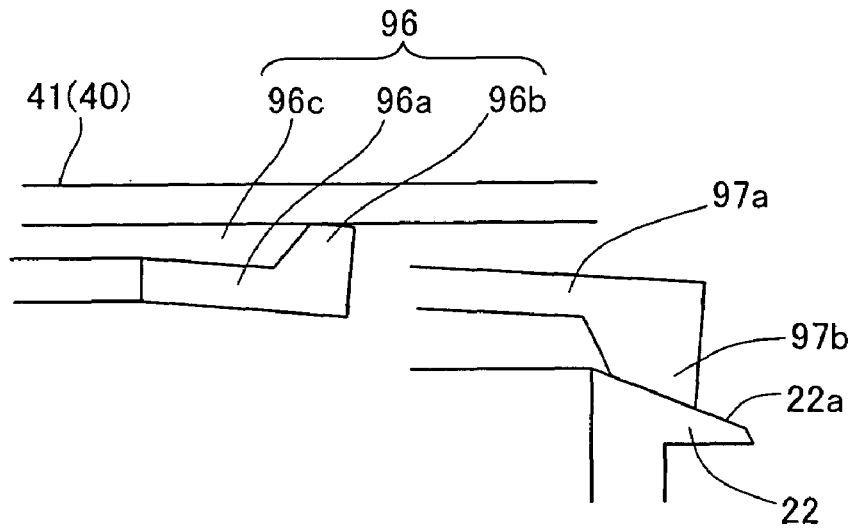
FIG. 15 shows the functions of first springs and second springs.

FIG. 14 shows the periphery of the torque plate 90. As shown in FIGS. 10 and 14, the torque plate 90 has first springs 96 and second springs 97 to hold the torque plate 90 between the bottom face of the upper wall 41 of the cover 40 and the upper portion of the cap main body 20. The four first springs 96 are arranged at angles of 90 degrees in the circumferential direction on the center portion of the torque plate 90. The first springs 96 apply a vertical spring force to the bottom face of the upper wall 41 of the cover 40. As shown in FIG. 15, each of the first springs 96 has an arm 96a that is formed on the same plane as the top face of the torque plate 90 and is extended as a cantilever in the circumferential direction, and a pressure projection 96b that is formed on a free end of the arm 96a to be protruded upward from the top face of the torque plate 90. Each of the second springs 97 has an arm body 97a that is formed as a cantilever slightly inclined downward, and a pressure projection 97b that is formed on a free end of the arm body 97a to be pressed against an inclined plane 22a of the flange 22. One end of the second spring 97 is tilted in a notch 97c formed on the top face of the torque plate 90. The pressure projections 97b of the second springs 97 press the inclined plane 22a of the flange 22, so that the second springs 97 are positioned in both the vertical direction and in the radial direction.

(3) Opening and Closing Operations of Fuel Cap 10

Figure 18:
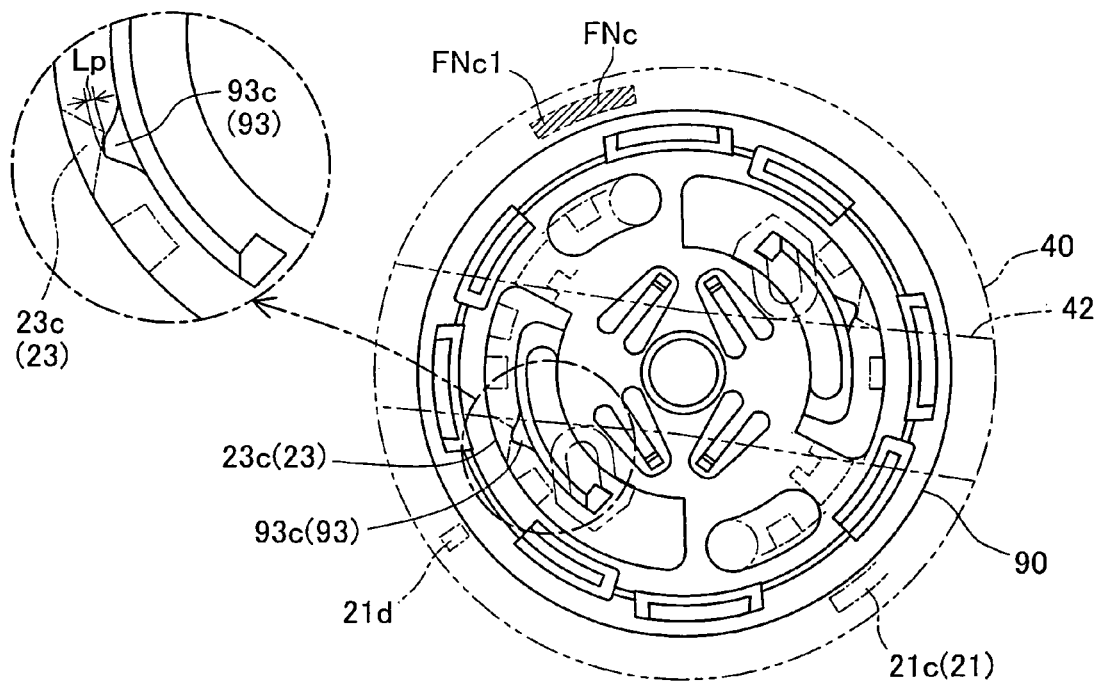
FIG. 18 shows the series of operations of the torque mechanism after the state of FIG. 17.
Figure 19:
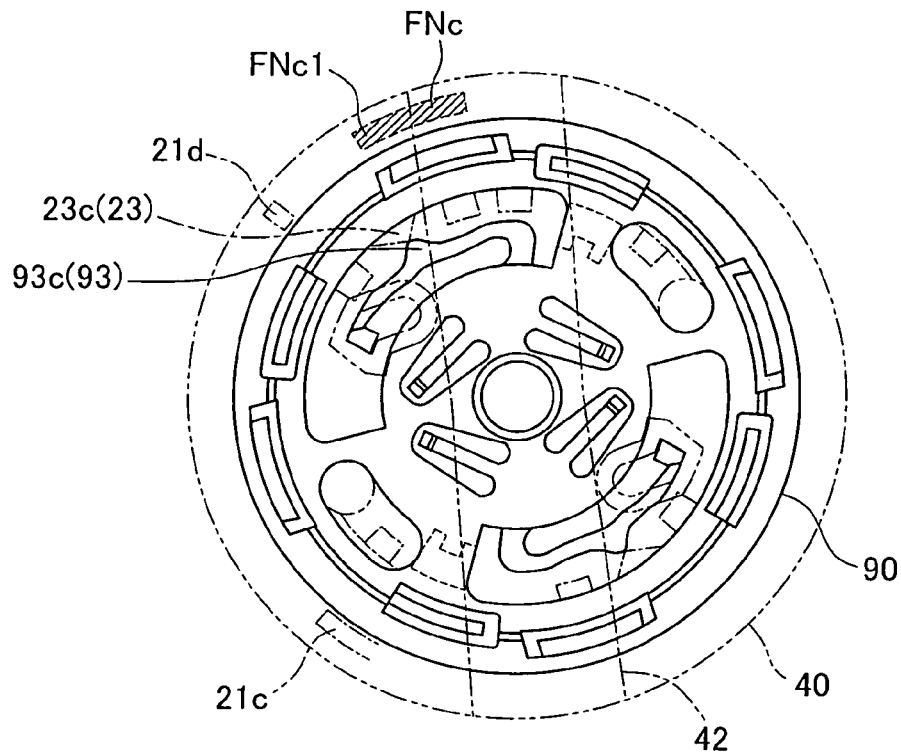
FIG. 19 shows the series of operations of the torque mechanism after the state of FIG. 18.
Figure 20:
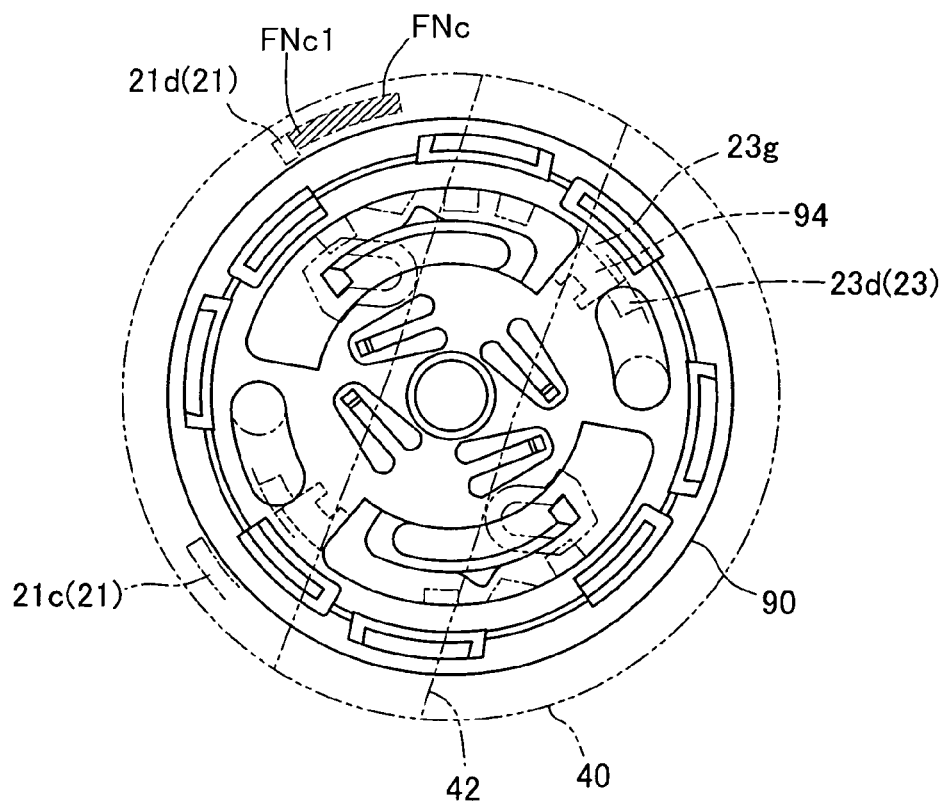
FIG. 20 shows the series of operations of the torque mechanism after the state of FIG. 19.
Figure 21:
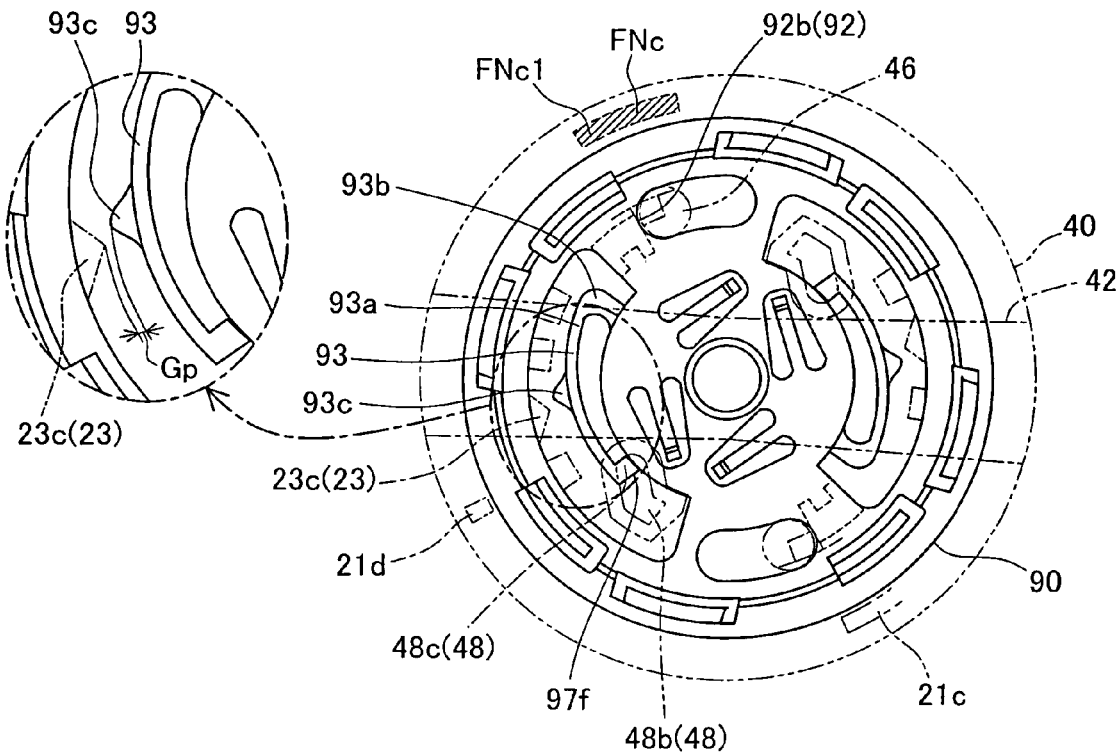
FIG. 21 shows the series of operations of the torque mechanism after the state of FIG. 20.
Figure 22:
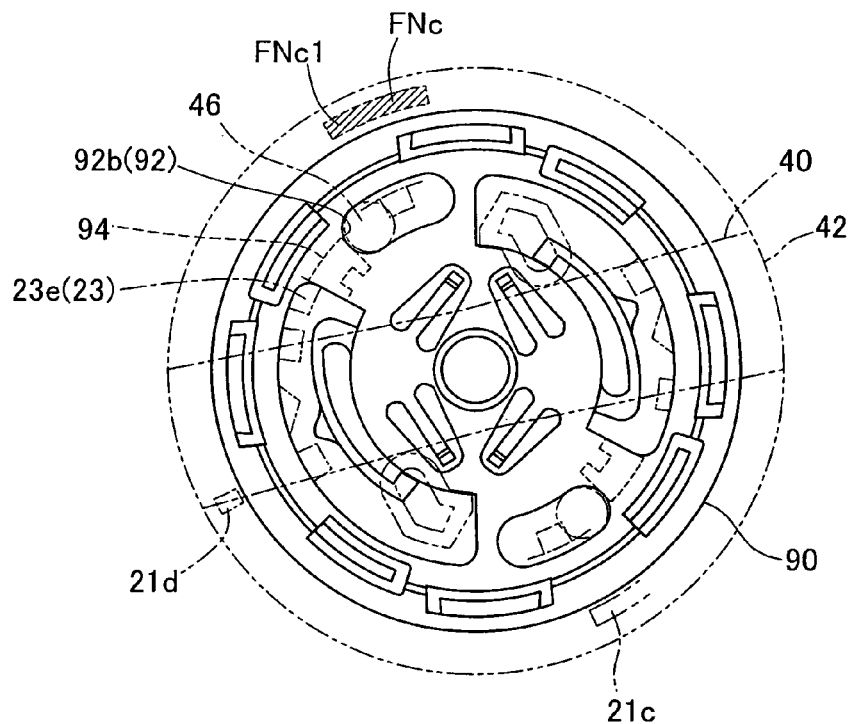
FIG. 22 shows the series of operations of the torque mechanism after the state of FIG. 21.

The following describes the functions of the torque mechanism 80 when the inlet opening FNb of the filler neck FN is opened and closed by the fuel cap 10. FIGS. 16 through 20 show a closing operation of the fuel cap 10. FIGS. 20 through 22 show an opening operation of the fuel cap 10. The torque mechanism 80 has two cover engagement elements 46, 46, two guide elements 48, 48, two torque arms 93, 93, and two body engagement elements 23, 23 arranged about the rotational axis of the torque plate 90, as mentioned above. The torque mechanism 80 accordingly has the symmetrical operations.

(3)-1 Closing Operation of Fuel Cap 10

The user holds the handle 42 of the cover 40 with thumb and index finger and inserts the cap main body 20 in the axial direction into the inlet opening FNb. The leader 21c of the male threading element 21 is set on the leader FNc1 of the female threading element FNc (see FIG. 2). When the user applies a rotational force to the handle 42 in the closing direction (clockwise), the torque mechanism 80 performs a series of operations as shown in FIGS. 16 to 20.

Figure 16:
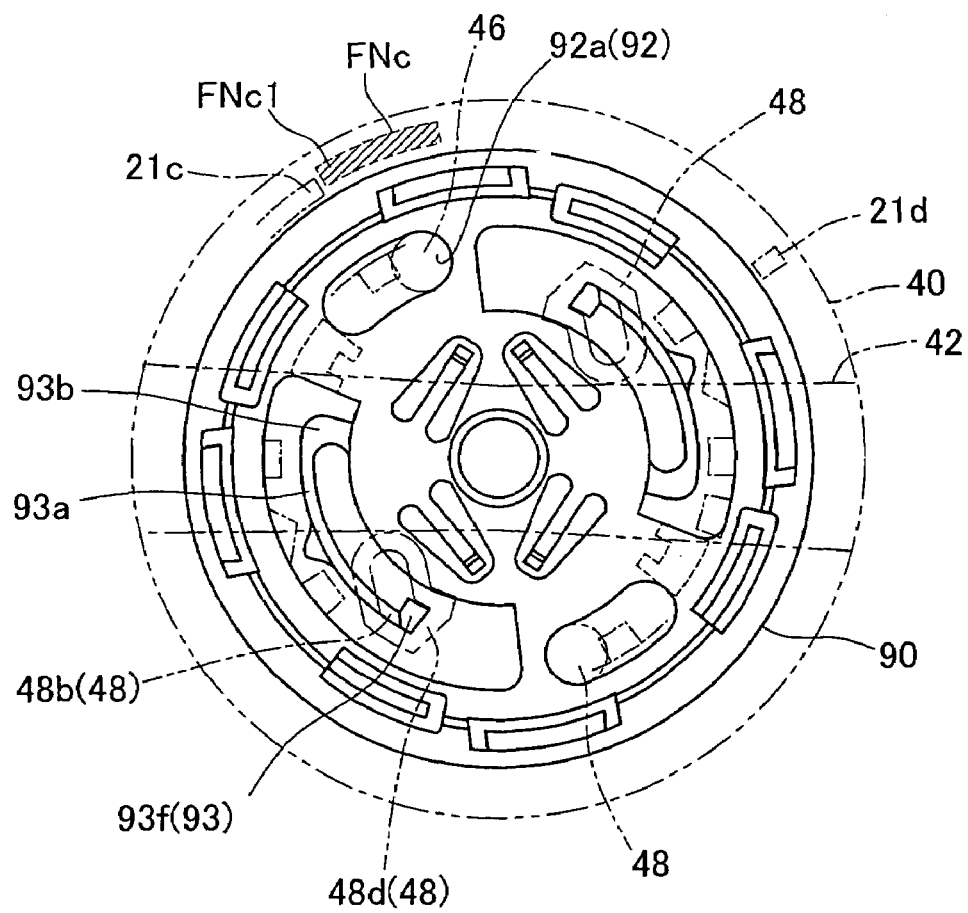
FIG. 16 shows a series of operations of the torque mechanism.

When a rotational force is applied to the handle 42 in the closing direction, the cover engagement elements 46, 46 of the cover 40 are guided by mating rib guide elements 92, while the guide projections 93f of the torque arms 93 are guided by the mating guide elements 48, as shown in FIG. 16. The cover engagement elements 46 then come into contact with pressure ends 92a of the respective rib guide elements 92, while the guide projections 93f of the torque arms 93 respectively move in the first guide grooves 48b to come into contact with the guide locking upright walls 48d. In this state, the cover 40 moves together with the torque plate 90 in the closing direction, and the torque arms 93 are supported by both the support bases 93b and the guide projections 93f.

Figure 17:
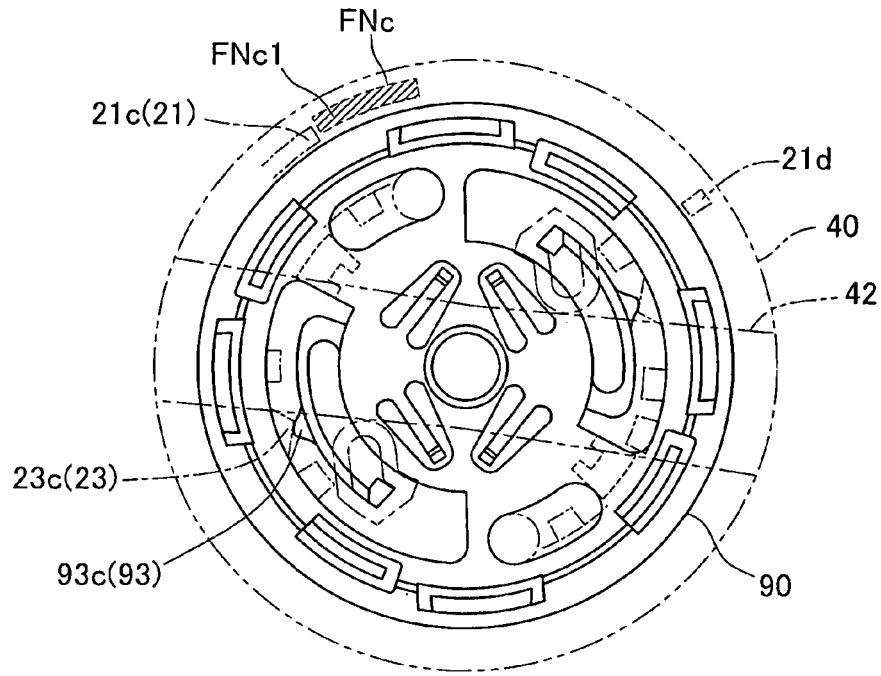
FIG. 17 shows the series of operations of the torque mechanism after the state of FIG. 16.

The cover 40 and the torque plate 90 are slightly rotated as shown in FIG. 17. The torque engagement projections 93c of the torque arms 93 then engage with the engagement projections 23c of the body engagement elements 23 by a lap Lp as shown in FIG. 18. Rotation of the handle 42 by approximately 180 degrees causes the cap main body 20 to be rotated integrally with the cover 40 and the torque plate 90 through this engagement. This inserts the cap main body 20 into the inlet opening FNb in the closing direction and enhances the engagement force of the male threading element 21 with the female threading element FNc. When the reactive force produced by the increasing engagement force exceeds a preset rotational torque, the torque engagement projections 93c of the torque arms 93 ride over the engagement projections 23c of the body engagement elements 23 to be set in a released position, as shown in FIG. 19.

With a slight rotation of the torque plate 90, the engagement projections 23c of the body engagement elements 23 engage with the torque engagement projections 93c of the torque arms 93 by the lap Lp (see FIG. 18) and press the torque engagement projections 93c in the radial direction. The torque arms 93 supported by the two fulcrums are thus elastically deformed to be set in a released position. The torque arms 93 click when being set in the released position. The fuel cap 10 is thus fit in the inlet opening FNb with some clamping torque to closes the inlet opening FNb. In the released position of the torque arms 93, guide projections 94 move in the guide steps 23f to come into contact with the first guide ends 23d as shown in FIG. 20. The cover 40, the torque plate 90, and the cap main body 20 rotate integrally to bring the stopper 21d of the male threading element 21 into contact with the leader FNc1 of the female threading element FNc. This prevents excessive compression of the gasket GS.

(3)-2 Opening Operation of Fuel Cap 10

In order to open the fuel cap 10, the user holds the handle 42 of the cover 40 with thumb and index finger and applies a counterclockwise rotational force to the handle 42 in the state of FIG. 20. In this state, the cap main body 20 is fit in the filler neck FN. The cover engagement elements 46 of the cover 40 move in the mating rib guide elements 92 to come into contact with pressure ends 92b, while the guide elements 48 guide the guide projections 93f of the torque arms 93 through the first guide grooves 48b to the second guide grooves 48c and bend the arm bodies 93a of the torque arms 93 about the support bases 93b toward the center, as shown in FIG. 21. The torque engagement projections 93c of the torque arms 93 are thus deflected toward the center to be apart from the engagement positions with the engagement projections 23c of the body engagement elements 23. This produces a gap Gp and gives no lap Lp (see FIG. 18).

As shown in FIG. 22, as the cover 40 and the torque plate 90 rotate counterclockwise relative to the cap main body 20, the guide projections 94 are guided on the guide steps 23f to come into contact with the second guide ends 23e. The torque engagement projections 93c of the torque arms 93 move in the deflected position not to engage with the engagement projections 23c of the body engagement elements 23. The torque arms 93 accordingly do not click.

While the guide projections 94 are in contact with the second guide ends 23e, the rotational torque of the cover 40 is transmitted to the cap main body 20 via the cover engagement elements 46 of the cover 40, the pressure ends 92b of the torque arms 93, the guide projections 94, and the second guide ends 23e of the body engagement elements 23. The cover 40, the torque plate 90, and the cap main body 20 thus rotate integrally counterclockwise.

Rotation of the cap main body 20 with the cover 40 by approximately 180 degrees resumes the state of FIG. 16. The male threading element 21 is separate from the leader FNc1 of the female threading element FNc of the filler neck FN, so that the cap main body 20 is released from the filler neck FN. The fuel cap 10 is then detached from the filler neck FN to open the inlet opening FNb.

Figure 23:
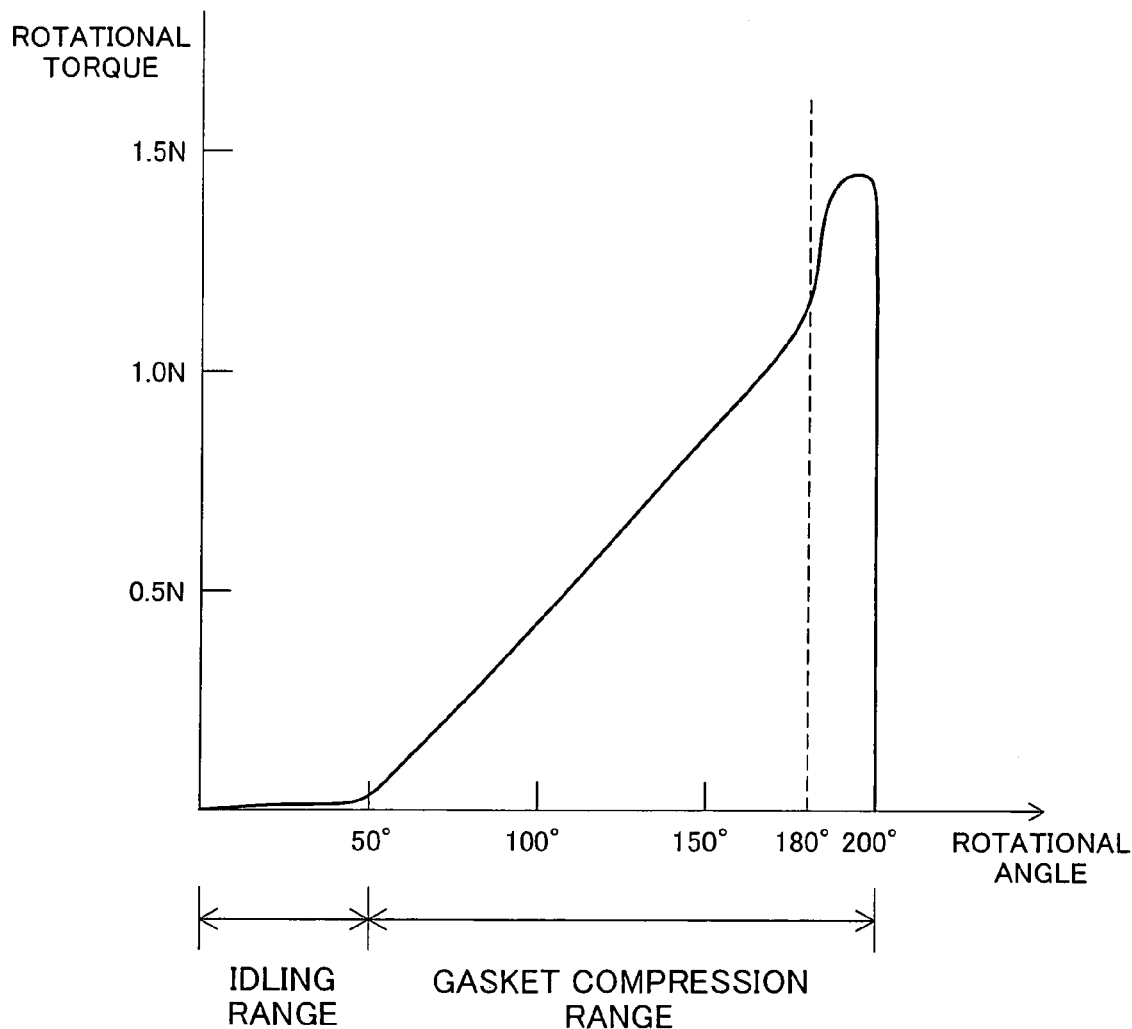
FIG. 23 is a graph showing a variation in rotational torque against the rotational angle of a handle.
Figure 24:
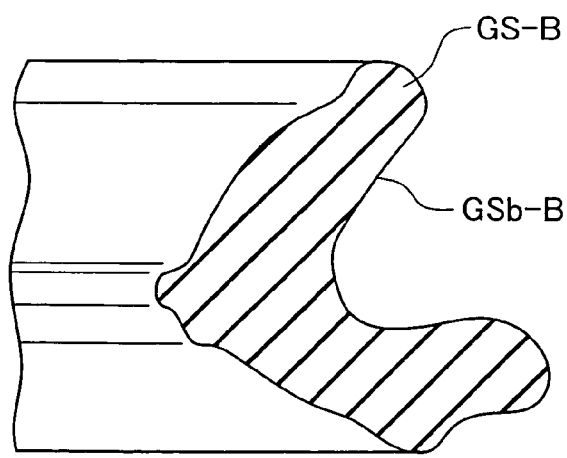
FIG. 24 is a sectional view showing a gasket in one modified example.
Figure 25:
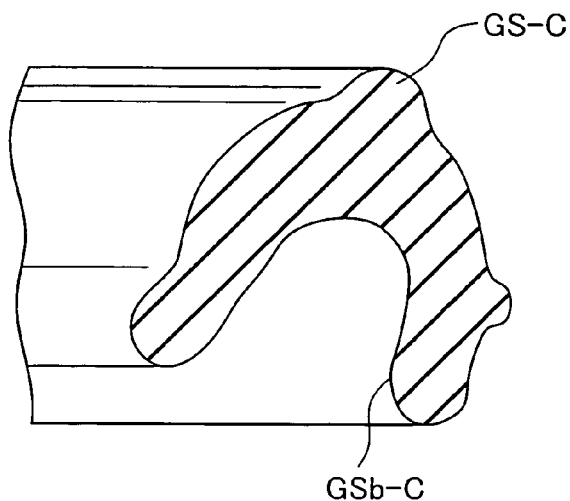
FIG. 25 is a sectional view showing a gasket in another modified example.

FIG. 23 is a graph showing a variation in rotational torque against the rotational angle of the handle 42. In the initial state of the closing operation when the fuel cap 10 is inserted into the inlet opening FNb and the handle 42 is rotated in the range of 0 to 50 degrees, the male threading element 21 does not engage with the female threading element FNc (idling state). The gasket GS is accordingly not contact with the pipe sealing face FNf Further rotation of the handle 42 exceeding 50 degrees compresses the gasket GS and increases the rotational torque. The gasket GS is gradually compressed from the state of FIG. 6(A) to the state of FIG. 6(B) and then the state of FIG. 6(C). When the rotational angle of the handle 42 exceeds 180 degrees, the torque mechanism 80 clicks (in the state of FIG. 19). When the rotational angle of the handle 42 reaches 200 degrees, the stopper 21d works to stop further rotation of the fuel cap 10 (in the state of FIG. 20).

(4) Effects of Embodiment

The structure of the embodiment has the following effects, in addition to those discussed above.

(4)-1 In the closing operation of the fuel cap 10, the torque plate 90 clicks when the torque engagement projections 93c of the torque arms 93 of the torque plate 90 ride over the engagement projections 23c of the body engagement elements 23. The user can thus confirm clamping of the fuel cap 10 with a certain level of torque. This structure enables the fuel cap 10 to be clamped with the certain level of torque, regardless of the elasticity of the gasket GS.

(4)-2 In the structure of the torque mechanism 80, when the cover 40 is rotated in the opening direction to open the fuel cap 10, the torque engagement projections 93c of the torque arms 93 are deflected by the guide elements 48 toward the center axis not to be in contact with the engagement projections 23c of the body engagement elements 23. The positional relation between the torque engagement projections 93c and the engagement projections 23c thus resume the initial state without any contact. In this state, the rotational torque is sufficiently small and there is no click. The user accordingly feels anything odd.

(4)-3 At a start of the closing operation of the fuel cap 10, the handle 42 is located at a preset position defined by the leader FNc1 of the female threading element FNc as shown in FIG. 16. At a start of the opening operation of the fuel cap 10, the handle 42 is located at another preset position defined by the stopper 21d of the male threading element 21 in contact with the leader FNc1 of the female threading element FNc as shown in FIG. 20. This ensures the good operating characteristics. Simple integral formation of the stopper 21d with the male threading element 21 makes the fuel cap 10 applicable to the filler neck FN with the conventional female threading element FNc. This does not cause a significant cost increase.

(4)-4 The maximum rotational angle of the fuel cap 10 in the closing direction is 160 to 200 degrees. Namely the fuel cap 10 is fully closed by approximately half a turn of the handle 42. This structure does not require plural turns of the handle 42 and thus ensures the good operating characteristics.

(5) Modifications

The embodiment discussed above is to be considered in all aspects as illustrative and not restrictive. There may be many modifications, changes, and alterations without departing from the scope or spirit of the main characteristics of the present invention. Some examples of possible modification are given below.

(5)-1 The above embodiment regards the structure of the fuel cap used for the fuel tank of the automobile. The structure of the invention may be applied to another cap, for example, a cap for a radiator tank.

Figure 26:
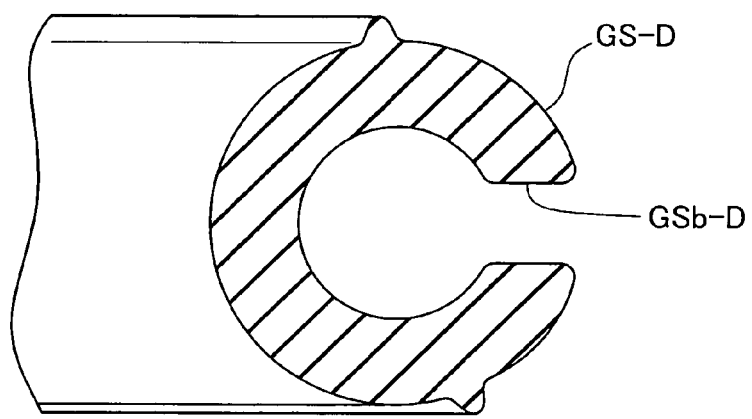
FIG. 26 is a sectional view showing a gasket in still another modified example.
Figure 27:
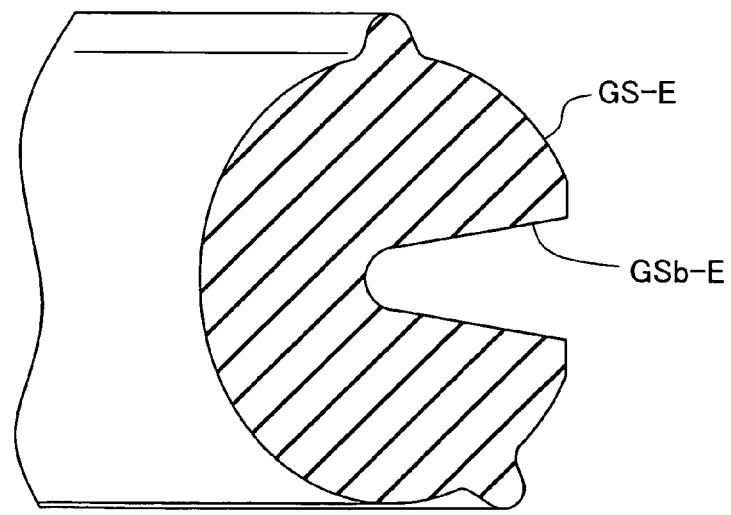
FIG. 27 is a sectional view showing a gasket in another modified example.

(5)-2 The structure of the gasket is not restricted to the above embodiment, but the gasket may have any of other cross sections shown in FIGS. 24 through 27. A gasket GS-B shown in FIG. 24 has a slit GSb-B open slightly upward. A gasket GS-C shown in FIG. 25 has a slit GSb-C open downward. This structure effectively prevents an undercut of the slit GSb-C and facilitates release of the gasket GS-C from a mold. A gasket GS-D shown in FIG. 26 is formed in a C shape and has a slit GSb-D that extends from a center circle to the outside. A gasket GS-E shown in FIG. 27 is formed in an elliptic shape and has a V-shaped slit GSb-E.

(5)-3 In the above embodiment, the fuel cap 10 applies the torsional force to the gasket GS in its rotation. The fuel cap may be closed by a vertical operational force, as long as the force is applied in the bending direction (in the direction of the rotational axis).

(5)-4 The tank with the gasket is not restricted to the fuel tank but may be any tank for storing another fluid.

(5)-5 The material of the gasket is not restricted to the fluororubber, but the gasket may be made of another material, for example, elastomer like NBR-PVC.

(5)-6 In the structure of the embodiment, when the fuel cap 10 is rotated in the closing direction, the torque engagement projections 93c engage with the engagement projections 23c by the lap Lp as shown in FIG. 18. When the fuel cap 10 is rotated in the opening direction, on the other hand, the torque arms 93 are deflected to produce a gap Gp and no lap Lp as shown in FIG. 21. The lap Lp may not be equal to zero but may be reduced to a level that does not make the user feel odd.

(5)-7 In the embodiment discussed above, the stopper is applied to the quick-turn constant torque cap. The stopper may be applied to the conventional screw cap or constant displacement cap. The constant displacement cap ensures the sealing properties of or over a certain level by the stroke (displacement) in the axial direction, instead of the torque. The use of the stopper effectively notifies the user of full close of the cap.

Figure 28:
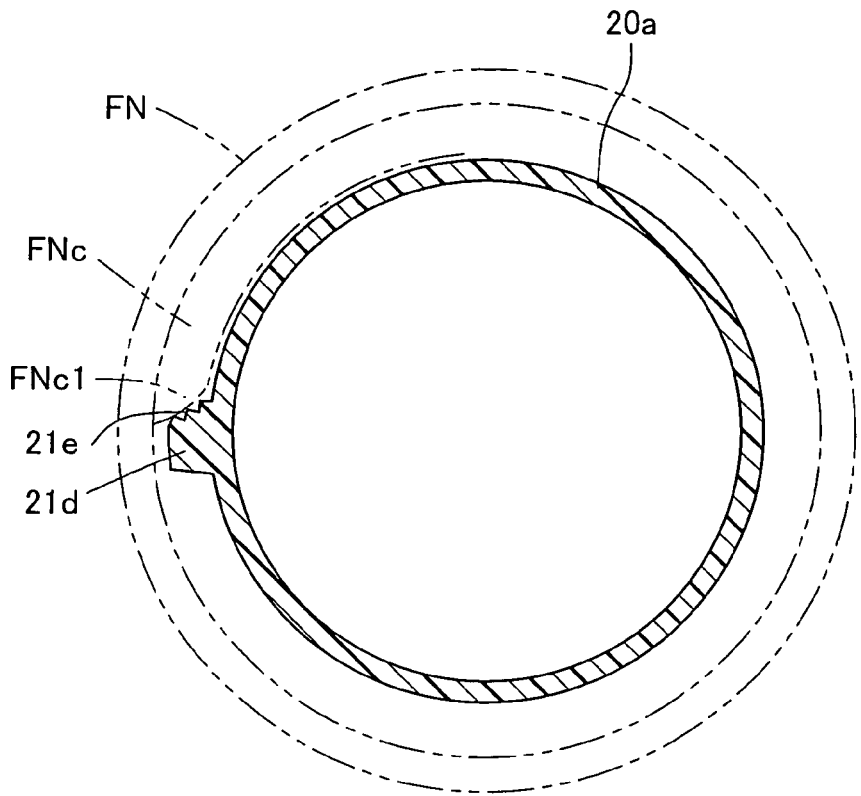
FIG. 28 is a horizontal sectional view showing an outer tubular member with the stopper of FIG. 2.
Figure 29:
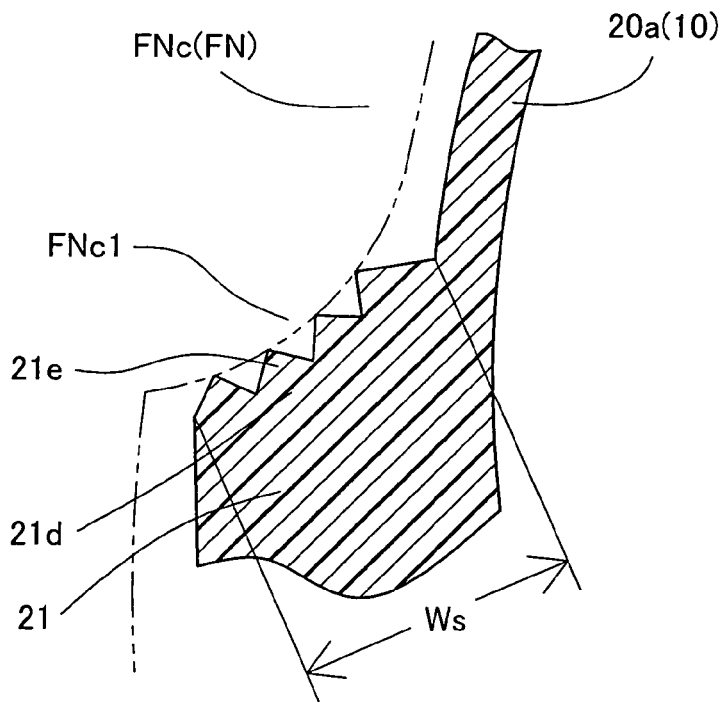
FIG. 29 is an enlarged view showing the stopper of FIG. 28.

FIG. 28 is a horizontal sectional view showing the outer tubular member 20a with the stopper 21d of FIG. 2. As shown in FIG. 28, the stopper 21d formed on the outer circumference of the outer tubular member 20a has multiple deformable projections 21e at a site coming into contact with the leader FNc1 of the female threading element FNc. FIG. 29 is an enlarged view showing the stopper 21d of FIG. 28. The deformable projections 21e are a chain of four sharp-pointed ridges that are formed substantially parallel to one another in the vertical direction (that is, the axial direction of the cap main body 20). It is preferable that the stopper 21d has an inclined face of a width Ws in a range of 3 to 6 mm and three to five deformable projections 21e with ridges of 0.5 to 2 mm in height.

As shown in FIGS. 1 through 3, when the fuel cap 10 fit in the fuel inlet FNb is rotated in its closing direction, the male threading element 21 is screwed in the female threading element FNc. When the gasket GS is compressed in the axial direction to or over a preset displacement, the stopper 21d comes into contact with the leader FNc1 of the female threading element FNc to restrict further rotation. The fuel cap 10 is fastened to the filler neck FN in this state.

Figure 30A:
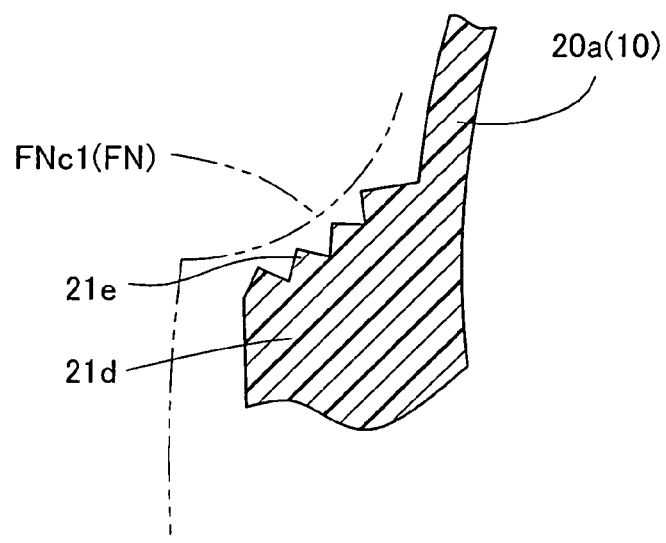
FIG. 30(A) shows the functions of the stopper of FIG. 28.
Figure 30B:
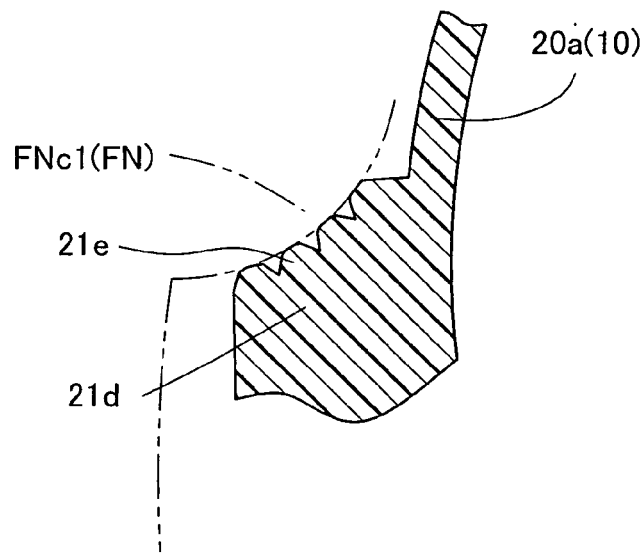
FIG. 30 (B) shows a series of the action of the stopper.
Figure 30C:
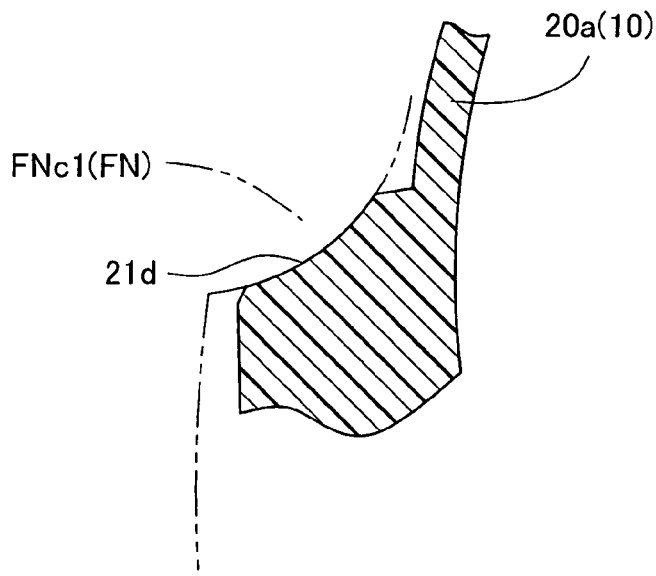

On the occasion of first use of the fuel cap 10 to close the fuel inlet FNb, when the leader FNc1 of the female threading element FNc presses the stopper 21d as shown in FIG. 30 (A), the ridges of the deformable projections 21e are deformed to fill the grooves with the crushed resin material as shown in FIGS. 30(B) and 30(C). The contact face of the stopper 21d follows the contour of the leader FNc1 of the female threading element FNc and is not returned to its original state. This increases the contact area of the stopper 21d with the leader FNc1 of the female threading element FNc and avoids the state of partial plane contact with the leader FNc1, which leads to increasing slippage. The stopper 21d has the sufficiently large contact area with the leader FNc1 of the female threading element FNc and does not ride over the leader FNc1, thus effectively stopping rotation of the fuel cap 10.

Because of the poor processing accuracy, the plastic female threading elements FNc fonned on the respective filler necks FN of metal pipes have significant variations. In the structure of this embodiment, however, in the first closing operation of the fuel cap 10, the stopper 21d is deformed to follow the leader FNc1 of the female threading element FNc on the filler neck FN. The fuel cap 10 is thus applicable to the varying female threading elements FNc of the respective filler necks FN.

Setting the size and the number of the deformable projections 21e to the above ranges enables the grooves between the deformable projections 21e to be effectively filled with the crushed resin material.

Figure 31:
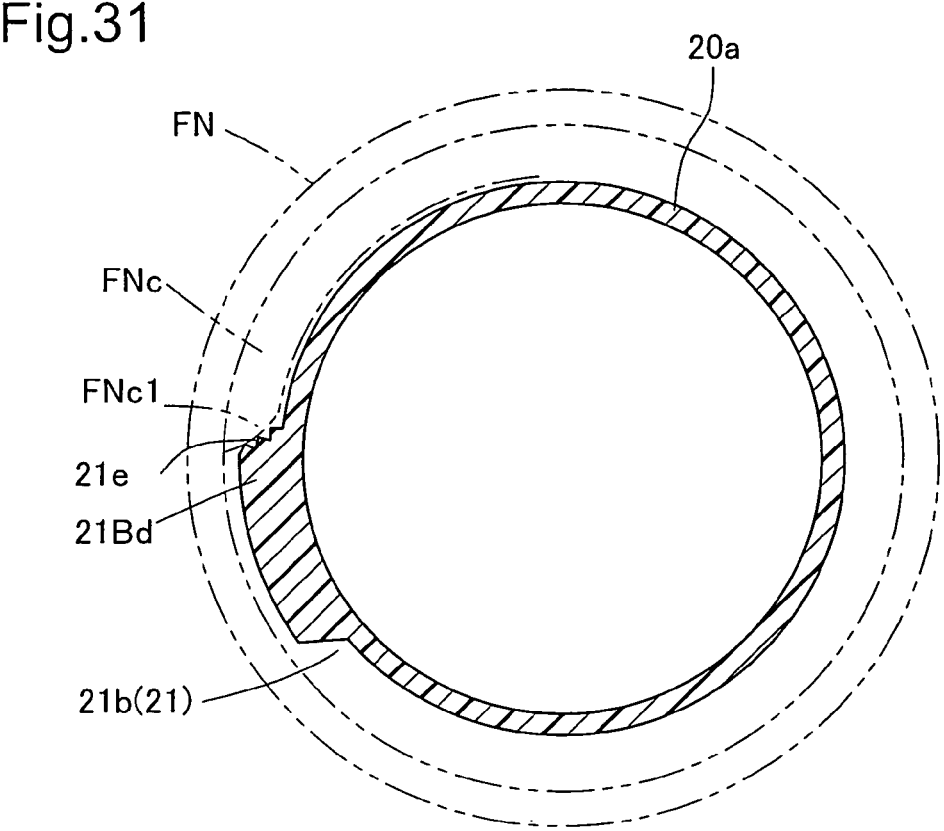
FIG. 31 shows a stopper in one modified example.

As shown in one modified example of FIG. 31, a stopper 21Bd may be extended along the thread groove 21b of the male threading element 21 or may be a terminal end of the thread groove 21b of the male threading element 21. Such structure desirably enhances the mechanical strength of the stopper 21Bd and extends the distance of the leader FNc1 of the female threading element FNc on the filler neck FN to ride over the stopper 21Bd. This arrangement thus prevents the leader FNc1 of the female threading element FNc from riding over the stopper 21Bd and effectively stops rotation of the fuel cap 10.

Figure 32:
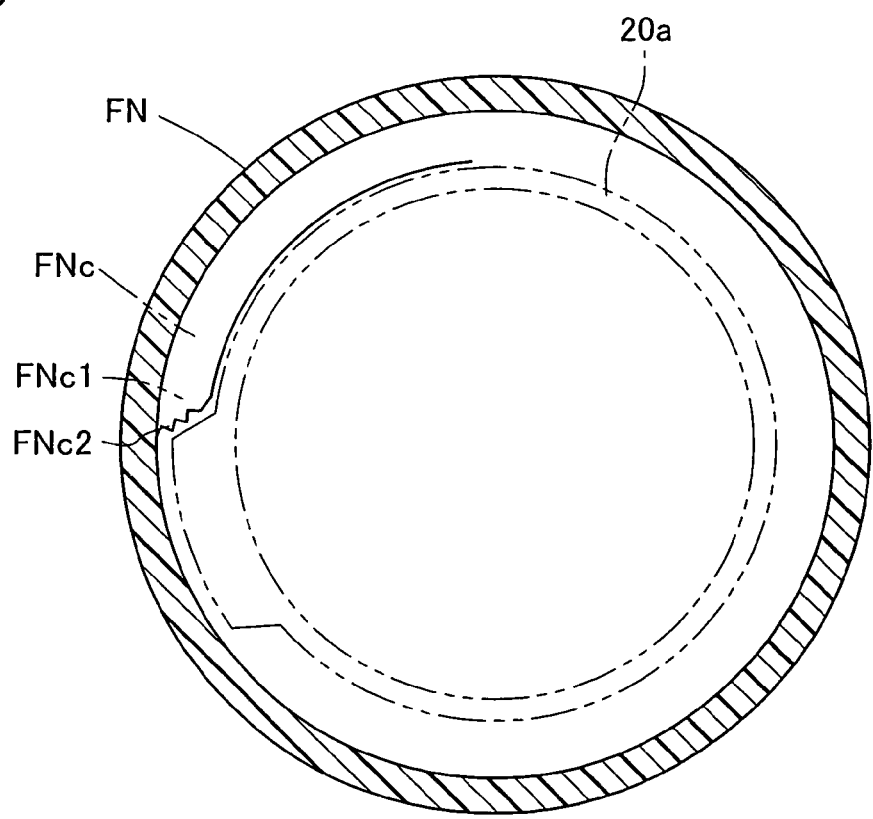
FIG. 32 shows a stopper and a filler neck in another modified example.

In the embodiment discussed above, the stopper 21d has the multiple deformable projections 21e. This structure is, however, not restrictive at all. In one modified structure shown in FIG. 32, the filler neck FN (opening formation member) is made of a resin material, and the leader FNc1 of the female threading element FNc (the first threading element) has multiple deformable projections FNc2. In this modified structure, the deformable projections FNc2 are deformed by the stopper 21d of the outer tubular member 20a.

Figure 33:
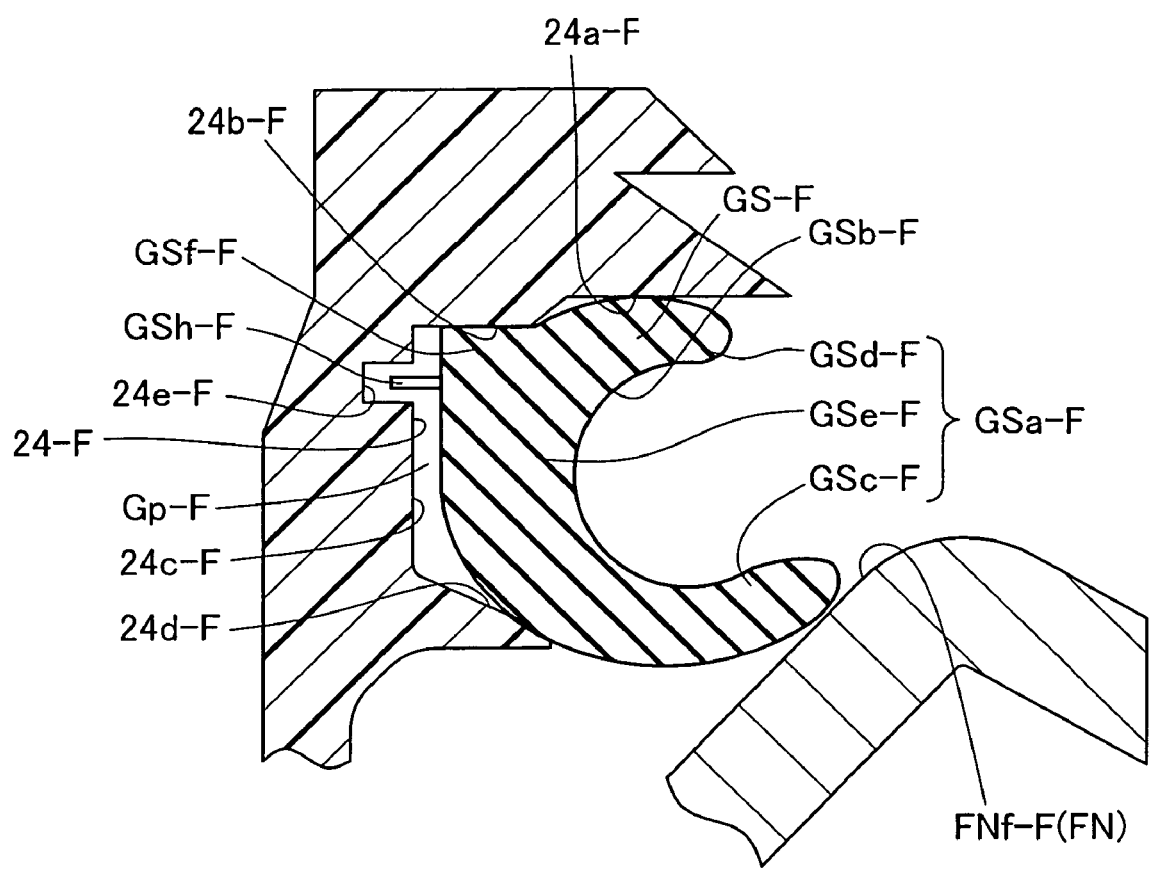
FIG. 33 is an enlarged sectional view showing the gasket set in the se al support member of the fuel cap

FIG. 33 is an enlarged sectional view showing the gasket GS-F set in the seal support member 24-F of the fuel cap according to another embodiment of the invention. The gasket GS-F is made of fluorocarbon rubber and has a gasket main body GSa-F that is formed to have a substantially C-shaped cross section and is compressed to shorten the length in its bending direction. The gasket main body GSa-F of the C-shaped cross section is formed to surround a slit GSb-F of a substantially U-shaped cross section, which is open to the outer side. The gasket main body GSa-F includes a first lip GSc-F that is pressed against the sealing face FNf-F of the filler neck FN, a second lip GSd-F, and a linkage element GSe-F that links the first lip GSc-F to the second lip GSd-F. The first lip GSc-F, the second lip GSd-F, and the linkage element GSe-F form the C-shaped cross section of the gasket main body GSa-F.

Figure 34A:
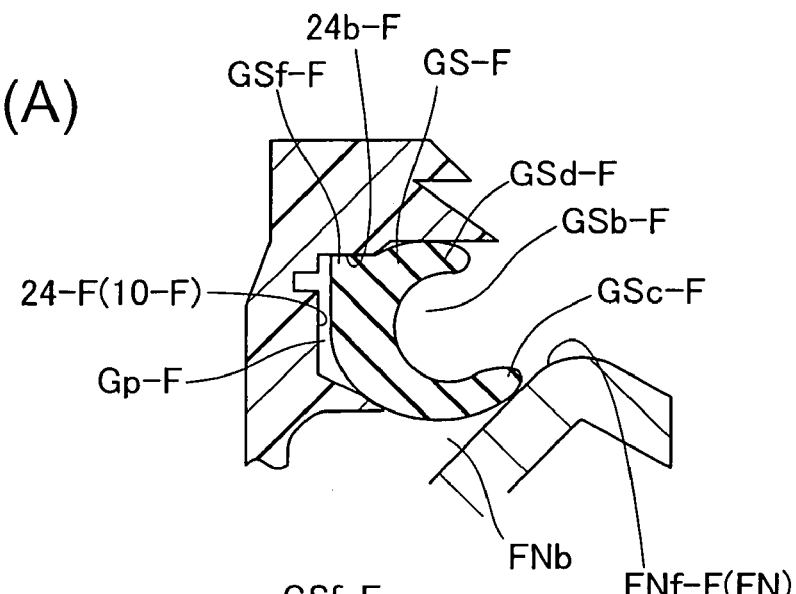
FIG. 34(A) shows compression of the gasket as the fuel cap is closed.
Figure 34B:
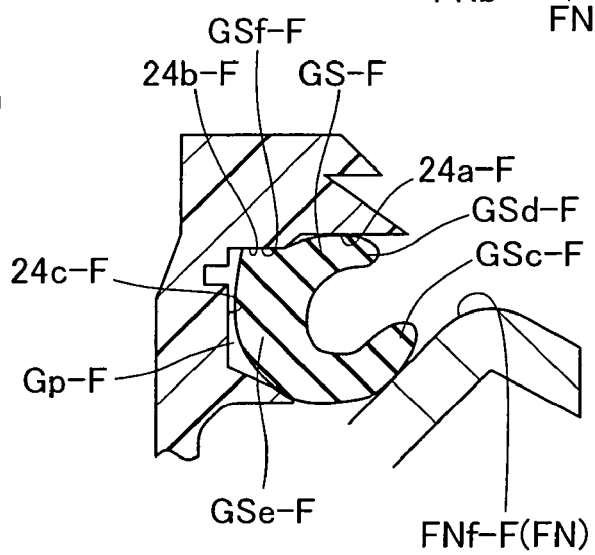
FIG. 34(B) shows the series of the compression of the gasket after the state of FIG. 34(A)
Figure 34C:
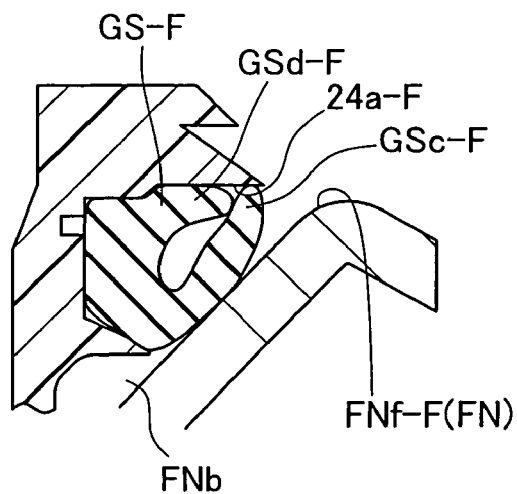
FIG. 34(C) shows the series of the compression of the gasket after the state of FIG. 34(B)

The first lip GSc-F is longer than the second lip GSd-F to bring the edge of the first lip GSc-F into contact with a first sealing wall 24a-F when the gasket GS-F is compressed by the sealing face FNf (see FIG. 34(C)). A baffle element GSf-F is protruded from the inner side of the gasket main body GSa-F to be located between the second lip GSd-F and the linkage element GSe-F.

(2)-2-2 Structure of Seal Support Member 24-F

The seal support member 24-F is a circular recess to support the outer circumference of the gasket GS-F. The seal support member 24-F has a first sealing wall 24a-F that supports the second lip GSd-F, a stopper step 24b-F functioning as a stopper element, a second sealing wall 24c-F, and a lower sealing face 24d-F. The stopper step 24b-F positions the baffle element GSf-F of the gasket GS-F and thereby functions to stop rotation of the gasket GS-F when the first lip GSc-F is compressed by the sealing face FNf.

The second sealing wall 24c-F faces the linkage element GSe-F of the gasket GS-F across a gap Gp-F. The gasket GS-F is elastically deformed to narrow the gap Gp-F when the first lip GSc-F receives a compressive force from the sealing face FNf-F.

The second sealing wall 24c-F has a circular sealing recess 24e-F to receive a gate end GSh-F, which is protruded from the outer circumference of the linkage element GSe-F of the gasket GS-F. The gate end GSh-F is a trace of the gate used for injection molding the gasket GS-F. The sealing recess 24e-F functions to equalize the sealing face pressure in the circumferential direction when the gate end GSh-F comes into contact with the second sealing wall 24c-F.

(2)-2-3 Sealing Function of Gasket GS-F

FIG. 34 shows compression of the gasket GS-F as the fuel cap is closed. In the initial stage of the closing operation of the fuel cap, the first lip GSc-F of the gasket GS-F comes into contact with the sealing face FNf-F (FIG. 34(A)). The further closing operation causes the first lip GSc-F to be compressed in the bending direction and narrow the opening of the slit GSb-F (FIG. 34(B)). At this stage, the baffle element GSf-F of the gasket GS-F is positioned by the stopper step 24b-F to prohibit rotation of the gasket GS-F. As the first lip GSc-F is pressed against the sealing face FNf-F, the linkage element GSe-F is deformed to narrow the gap Gp-F relative to the second sealing wall 24c-F. The edge of the first lip GSc-F comes into contact with the first sealing wall 24a-F on the immediate side of the edge of the second lip GSd-F. This completes compression of the gasket (FIG. 34(C)), so that the fuel cap closes the fuel inlet FNb.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cap device, comprising:
a pipe-shaped opening formation member having a tank opening and a flow path connecting the tank opening to a tank;
a cap having a closer that closes the tank opening and a handle that is mounted on the closer to rotate the closer in either of a closing direction and an opening direction;
a gasket that is located between an outer circumference of the closer and a sealing face of the opening formation member; and
a screw mechanism having a first threading element that is formed on an inner wall of the opening formation member and a second threading element that is formed on the outer circumference of the closer to engage with the first threading element, where the second threading element is screwed into the first threading element from a leader of the first threading element in response to rotation of the handle in the closing direction, so that the gasket is pressed against and displaced relative to the inner wall of the opening formation member to attach the cap into the opening formation member, wherein
the second threading element of the screw mechanism has a stopper that comes into contact with the leader of the first threading element and is configured to restrict further rotation of the closer in the closing direction after the gasket is pressed in an axial direction by at least a predetermined displacement,
the screw mechanism sets a moving distance of the cap in the axial direction to be not less than 2 mm, while the second threading element engages with the leader of the first threading element and is then screwed into the first threading element to a filly closed position where the stopper comes into contact with the leader of the first threading element, and
the gasket has a reactive force of not greater than 160 N from the sealing face of the opening formation member and a sealing face pressure of not less than 0.3 MPa against the sealing face when the moving distance of the cap at the fully closed position is 3.0 mm.

2. The cap device in accordance with claim 1, wherein the gasket has a reactive force of not greater than 130 N and a sealing face pressure of not less than 0.5 MPa when the moving distance of the cap is 3.0 mm.

3. The cap device in accordance with claim 1, wherein the first threading element is a female threading element, the second threading element is a male threading element, and the stopper is a projection formed in a thread groove of the male threading element.

4. The cap device in accordance with claim 1, wherein the closer has a ring-shaped seal support element that is protruded from the outer circumference of the closer to hold the gasket, and the projection of the stopper is a wall that crosses the thread groove formed between the seal support element and a thread ridge.

5. The cap device in accordance with claim 1, wherein the projection of the stopper is a wall that crosses the thread groove of the male threading element.

6. A cap device, comprising:
a pipe-shaped opening formation member having a tank opening and a flow path connecting the tank opening to a tank;
a cap having a closer that closes the tank opening and a handle that is mounted on the closer to rotate the closer in either of a closing direction and an opening direction;
a gasket that is located between an outer circumference of the closer and a sealing face of the opening formation member; and
a screw mechanism having a first threading element that is formed on an inner wall of the opening formation member and a second threading element that is formed on the outer circumference of the closer to engage with the first threading element, where the second threading element is screwed into the first threading element from a leader of the first threading element in response to rotation of the handle in the closing direction, so that the gasket is pressed against and displaced relative to the inner wall of the opening formation member to attach the cap into the opening formation member, wherein
the second threading element of the screw mechanism has a stopper that comes into contact with the leader of the first threading element and is configured to restrict further rotation of the closer in the closing direction after the gasket is pressed in an axial direction by at least a predetermined displacement,
the gasket includes
a gasket main body having a first lip that is pressed against the sealing face, a second lip, and a linkage element that links the first lip to the second lip, where the first lip, the second lip, and the linkage element form a C-shaped cross section of the gasket main body, and a baffle element that is formed on an outer circumference of the gasket main body and is located between the second lip and the linkage element,
the seal support member includes
(i) a first sealing wall that supports the second lip, (ii) a second sealing wall that is extended from the first sealing wall in the closing direction of the closer and is coupled with the first sealing wall to define a recess, and (iii) a stopper element that positions the baffle element,
the second sealing wall of the seal support member faces the linkage element of the gasket across a gap, and the linkage element narrows the gap when the first lip of the gasket main body receives a compressive force from the sealing face, and
the first lip is longer than the second lip to bring the edge of the first lip into contact with a first sealing wall when the gasket is compressed by the sealing face.

7. The cap device in accordance with claim 6, wherein the second sealing wall has a circular sealing recess to receive a gate end, the gate end being protruded from the outer circumference of the linkage element.

8. A cap device, comprising:
- a pipe-shaped opening formation member having a tank opening and a flow path connecting the tank opening to a tank;
- a cap having a closer that closes the tank opening and a handle that is mounted on the closer to rotate the closer in either of a closing direction and an opening direction;
- a gasket that is located between an outer circumference of the closer and a sealing face of the opening formation member; and
- a screw mechanism having a first threading element that is formed on an inner wall of the opening formation member and a second threading element that is formed on the outer circumference of the closer to engage with the first threading element, where the second threading element is screwed into the first threading element from a leader of the first threading element in response to rotation of the handle in the closing direction, so that the gasket is pressed against and displaced relative to the inner wall of the opening formation member to attach the cap into the opening formation member, wherein the closer has a ring-shaped seal support element that is protruded from the outer circumference of the closer to hold the gasket, the first threading element is a female threading element, and the second threading element is a male threading element, and has a stopper that comes into contact with the leader of the first threading element, the stopper being configured to restrict further rotation of the closer in the closing direction after the gasket is pressed in an axial direction by at least a predetermined displacement, wherein the stopper has multiple deformable projections that cross a groove formed between the seal support element and a thread ridge of the second threading element, wherein the multiple deformable projections form ridges at a site coming into contact with the leader of the first threading element, and are configured to be deformed to fill grooves between the ridges of the deformable projections and then to follow the leader when pressed by the leader of the first threading element.

* * * * *